(12) United States Patent
Meador et al.

(10) Patent No.: US 12,086,753 B2
(45) Date of Patent: Sep. 10, 2024

(54) SYSTEM AND METHOD FOR DELIVERY BY AUTONOMOUS VEHICLES

(71) Applicant: GM Cruise Holdings LLC, San Francisco, CA (US)

(72) Inventors: Timothy Jon Meador, Fairfield, CA (US); Alexis DeStasio, San Francisco, CA (US); Andrew W. Clavijo, Hayward, CA (US); Jordan Hale Factor, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 505 days.

(21) Appl. No.: 17/519,012

(22) Filed: Nov. 4, 2021

(65) Prior Publication Data

US 2023/0094045 A1 Mar. 30, 2023

Related U.S. Application Data

(63) Continuation of application No. 17/518,125, filed on Nov. 3, 2021.

(Continued)

(51) Int. Cl.
*G06Q 10/0832* (2023.01)
*B60K 35/00* (2024.01)
(Continued)

(52) U.S. Cl.
CPC ......... *G06Q 10/0832* (2013.01); *B60K 35/00* (2013.01); *B60P 1/6409* (2013.01);
(Continued)

(58) Field of Classification Search
CPC ........... G06Q 10/0832; G06Q 10/0837; G06Q 10/083
See application file for complete search history.

(56) References Cited

U.S. PATENT DOCUMENTS

D55,172 S 5/1920 Hoffman
D202,262 S 9/1965 Brunger et al.
(Continued)

OTHER PUBLICATIONS

Uber, "Send and receive packages with Uber," Uber Blog, Jul. 29, 2021, Retrieved from https://www.uber.com/en-PL/blog/connect/ (Year: 2021).*

*Primary Examiner* — Rupangini Singh
*Assistant Examiner* — Bryan J Kirk

(57) ABSTRACT

An AV receives a delivery request made by a user. The AV navigates to the user's location. The AV's onboard controller determines that the AV has arrived at the location. The onboard controller then commands the AV's motor to pause motion. The onboard controller provides the user an access to a delivery assembly in the AV. The onboard controller or the delivery assembly detects, by using sensors in the delivery assembly, whether an item has been removed from or placed into the container. Subsequent to detecting that the item has been removed from or placed into the container, the onboard controller commands the AV's motor to resume motion. The onboard controller or delivery assembly may also control a movable element in the container to allow the user to load or unload the item from a safe spot or control a divider in the container to protect the user's privacy.

18 Claims, 18 Drawing Sheets

Related U.S. Application Data

(60) Provisional application No. 63/250,069, filed on Sep. 29, 2021.

(51) Int. Cl.
  *B60P 1/64* (2006.01)
  *B60W 60/00* (2020.01)
  *G06Q 10/0833* (2023.01)
  *G06Q 10/0835* (2023.01)
  *G06Q 10/0836* (2023.01)
  *G06Q 10/087* (2023.01)
  *B60K 35/10* (2024.01)
  *B60K 35/22* (2024.01)
  *B60K 35/60* (2024.01)

(52) U.S. Cl.
  CPC ......... *B60P 1/6418* (2013.01); *B60W 60/001* (2020.02); *B60W 60/00256* (2020.02); *G06Q 10/0833* (2013.01); *G06Q 10/0835* (2013.01); *G06Q 10/0836* (2013.01); *G06Q 10/087* (2013.01); *B60K 35/10* (2024.01); *B60K 35/22* (2024.01); *B60K 35/60* (2024.01); *B60K 2360/11* (2024.01); *B60K 2360/21* (2024.01); *B60K 2360/794* (2024.01); *B60W 2420/408* (2024.01)

(56) References Cited

U.S. PATENT DOCUMENTS

| | | |
|---|---|---|
| D204,251 S | 4/1966 | Granau et al. |
| D291,984 S | 9/1987 | Cornwell |
| D339,230 S | 9/1993 | Thompson |
| D347,439 S | 5/1994 | Vananderoye |
| D384,015 S | 9/1997 | Stenger et al. |
| D524,208 S | 7/2006 | Seidel et al. |
| D535,974 S | 1/2007 | Alwicker et al. |
| D544,630 S | 11/2007 | Ma |
| D556,130 S | 11/2007 | Tajima et al. |
| D582,413 S | 12/2008 | Parker et al. |
| D591,292 S | 4/2009 | Parker |
| D616,438 S | 5/2010 | Mugica et al. |
| D618,681 S | 6/2010 | Richter et al. |
| D637,192 S | 5/2011 | Andre et al. |
| D705,751 S | 5/2014 | Wenger et al. |
| D708,182 S | 7/2014 | Ishii et al. |
| D765,011 S | 8/2016 | Martin et al. |
| D824,827 S | 8/2018 | Fujii |
| D825,609 S | 8/2018 | Andrizzi et al. |
| D865,604 S | 11/2019 | Kang |
| D901,496 S | 11/2020 | Hachiya |
| 11,222,299 B1* | 1/2022 | Baalke ............... G01C 21/3688 |
| D967,726 S | 10/2022 | Jeong et al. |
| 2018/0224867 A1 | 8/2018 | Yu et al. |
| 2021/0031370 A1* | 2/2021 | Spurgeon ............... B25J 9/1669 |
| 2021/0231876 A1 | 7/2021 | Galliano, III et al. |
| 2021/0025472 A1 | 8/2021 | Javidan et al. |
| 2021/0256472 A1* | 8/2021 | Javidan ................... H04W 4/12 |
| 2021/0370989 A1* | 12/2021 | Morimura ....... B60W 60/00256 |

\* cited by examiner

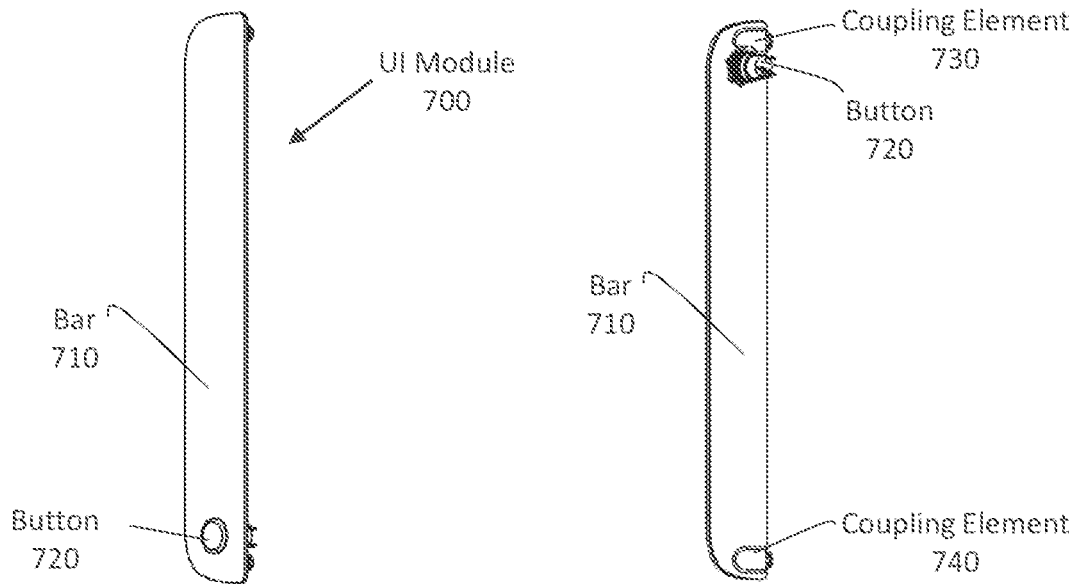
FIG. 7A
FIG. 7B
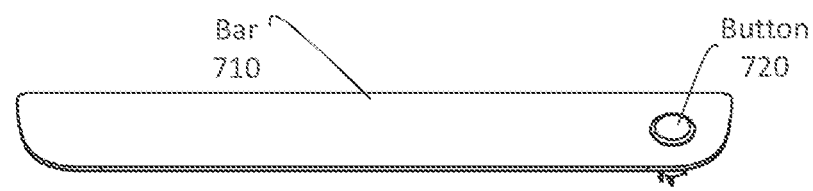
FIG. 7C
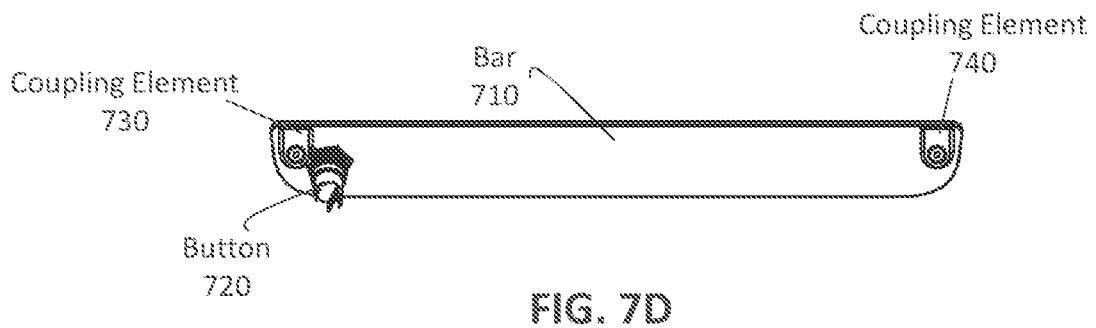
FIG. 7D

SYSTEM AND METHOD FOR DELIVERY BY AUTONOMOUS VEHICLES

CROSS REFERENCE TO RELATED APPLICATION

This application is a continuation of U.S. application Ser. No. 17/518,125, filed Nov. 3, 2021, which claims the benefit of U.S. Provisional Patent Application No. 63/250,069, filed Sep. 29, 2021, each of which is incorporated by reference its entirety.

TECHNICAL FIELD OF THE DISCLOSURE

The present disclosure relates generally to autonomous vehicles (AVs) and, more specifically, to systems and methods for autonomous delivery by using such vehicles.

BACKGROUND

An AV is a vehicle that is capable of sensing and navigating its environment with little or no user input. An autonomous vehicle may sense its environment using sensing devices such as Radio Detection and Ranging (RADAR), Light Detection and Ranging (LIDAR), image sensors, cameras, and the like. An autonomous vehicle system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

Figure (FIG. 1 shows an autonomous delivery environment according to some embodiments of the present disclosure;

FIGS. 7A-E are various views of a user interface (UI) module according to some embodiments of the present disclosure;

DESCRIPTION OF EXAMPLE EMBODIMENTS OF THE DISCLOSURE

Overview

Figure 1:
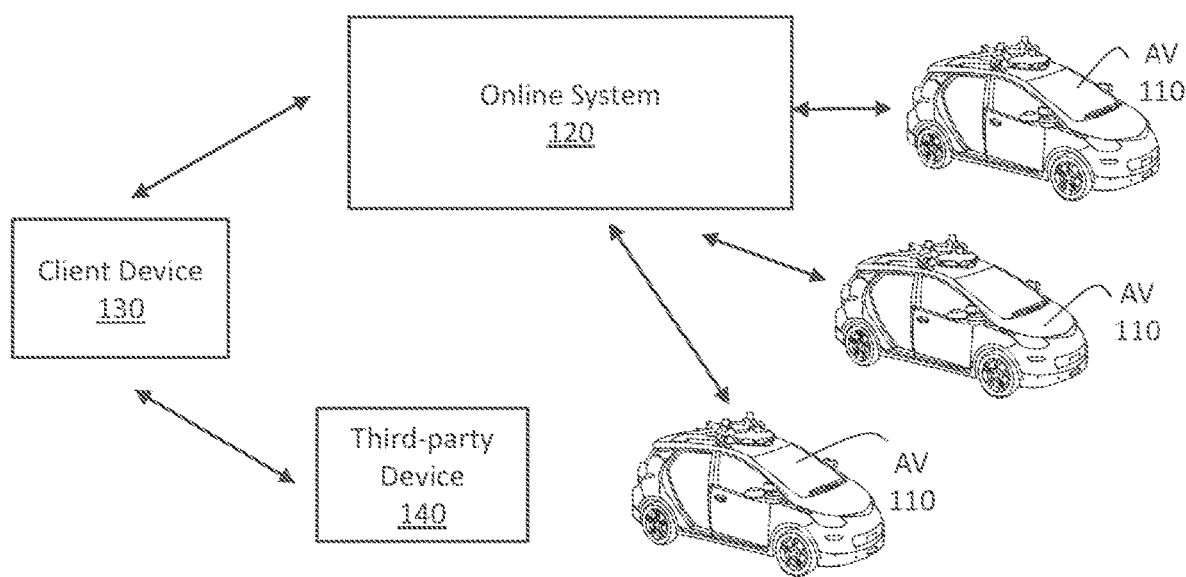

The demand for contactless delivery robots has been rising. However, many contactless delivery robots cannot meet the rising demand due to high cost and technical challenges. For example, many contactless delivery robots are designed for delivering a particular type of item and cannot be used to delivery different items. Also, these robots cause safety and privacy risks. Therefore, improved technology for autonomous delivery is needed.

An autonomous delivery system including a delivery assembly secured in an AV overcomes these problems. The system uses localization and navigation capabilities of the AV as well as safety and privacy features of the delivery assembly to provide a more advantageous autonomous delivery method. The AV can navigate to delivery destinations and control users' access to the delivery assembly by using its onboard sensors and onboard controller. For instance, the onboard controller detects whether the AV has arrived at the destination, opens a door of the AV after the AV has arrived, and closes the door after the delivered item has been removed from or placed into the delivery assembly. In an example where the AV parks on a street after it arrives at the destination, the AV opens the curbside door (i.e., the door facing the curb of the street), as opposed to the traffic-side door (i.e., the door facing the traffic on the street) to protect the safety of the user.

The delivery assembly is secured (e.g., removably secured) in the AV and facilitates delivering items to users or picking up items from users by using the AV. In some embodiments, the delivery assembly includes a container, a UI module, and a delivery controller. The container contains the items within a secured space, e.g., during the AV's motion. The container can have various configurations to fit different types of items. The container may facilitate one or more safety features or privacy features. For instance, a receptacle can be movably attached in the container and be moved towards or away from the curbside door of the AV to provide the user easy access from a safe spot. The user does not have to get into the AV or go to the traffic side of the AV to remove or place an item that is far from the curbside door. The container may also facilitate a privacy feature (e.g., a divider) that prevents a user from viewing items for a different user. The UI module provides information of the delivery to the user and allows the user to provide input, e.g., input for controlling the movable element.

The delivery controller manages the other components of the delivery assembly. For instance, the delivery controller processes sensor data generated by sensors on the container to detect the state of the items, e.g., whether the items are present in the container, the physical condition of the items, etc. The delivery controller may instruct the UI module to provide indicators (light, text, sound, etc.) to users to inform the user of the state of the items or to instruct the user to provide input based on the state of the items. The delivery controller may further command an actuator to move the movable element. The delivery controller may be connected to the onboard controller, e.g., through a private connection. Some or all of the functionality attributed to the delivery controller may be accomplished by the onboard controller of the AV 110. For example, the onboard controller may process the sensor data to detect the state of the items and control the door based on the state of the items. As another example, the onboard controller may instruct the UI module to provide indicators associated with the state of the door.

The autonomous delivery system leverages the autonomous features of the AV such as autonomous localization, navigation, and door control. Also, it can provide safe and private delivery service by using the delivery assembly. Further, the delivery assembly can be taken off from the AV so that the AV can still be used for other purposes, e.g., rideshare. By combining the AV and the delivery assembly, the high cost and technical challenges for autonomous delivery can be reduced or even avoided. Also, the safety and privacy of users are better protected.

As will be appreciated by one skilled in the art, aspects of the present disclosure, in particular aspects of autonomous delivery, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

Other features and advantages of the disclosure will be apparent from the following description and the claims.

As described herein, one aspect of the present technology may be the gathering and use of data available from various sources to improve quality and experience. The present disclosure contemplates that in some instances, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example Autonomous Delivery System

FIG. 1 shows an autonomous delivery environment 100 according to some embodiments of the present disclosure.

The autonomous delivery environment 100 includes AVs 110, an online system 120, a client device 130, and a third-party device 140. In other embodiments, the autonomous delivery environment 100 may include fewer, more, or different components. For instance, the autonomous delivery environment 100 may include a different number of AVs. A single AV is referred to herein as AV 110, and multiple AVs are referred to collectively as AVs 110. For purpose of simplicity and illustration, FIG. 1 shows one client device 130 and one third-party device 140. In other embodiments, the autonomous delivery environment 100 includes multiple third-party devices or multiple client devices.

In some embodiments, the autonomous delivery environment 100 includes one or more communication networks (not show in FIG. 1) that supports communications between some or all of the components in the autonomous delivery environment 100. A network may comprise any combination of local area and/or wide area networks, using both wired and/or wireless communication systems. In one embodiment, the network uses standard communications technologies and/or protocols. For example, the network includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network may be encrypted using any suitable technique or techniques.

An AV 110 is a vehicle that is capable of sensing and navigating its environment with little or no user input. The AV 110 may be a semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc.

In some embodiments, an AV 110 includes an onboard sensor suite. The onboard sensor suite detects surrounding environment of the AV 110 and generates sensor data describing the surround environment. The onboard sensor suite may include various types of sensors. In some embodiments, the onboard sensor suite includes a computer vision ("CV") system, localization sensors, and driving sensors. For example, the onboard sensor suite may include photodetectors, cameras, RADAR, Sound Navigation And Ranging (SONAR), LIDAR, GPS, wheel speed sensors, inertial measurement units (IMUs), accelerometers, microphones, strain gauges, pressure monitors, barometers, thermometers, altimeters, ambient light sensors, etc. The sensors may be located in various positions in and around the AV 110.

In some embodiments, the onboard sensor suite may include one or more sensors for a delivery assembly that is secured in the AV 110. The delivery assembly facilitating delivery of items (e.g., prepared foods, groceries, packages, etc.) by the AV 110. The delivery assembly defines a space where the items can be stored in the AV 110. The space may be a controlled environment. For example, access to the space may requirement authentication of the identity of a user. As another example, a physical condition (e.g., temperature, lightening, etc.) of the space is maintained at a desired level. The delivery assembly may include features that facilitate users (e.g., customers or personnel of a retail entity) to load or unload items from the AV 110. The delivery assembly may support a UI that provides the users information regarding the loading or unloading process. The UI may also allow the users to interact with the delivery assembly or the AV 110 during the loading or unloading process. The delivery assembly may include safety features to protect the safety of the users during the loading or unloading process. The delivery assembly may also include privacy features to protect the privacy of the user. More details about the delivery assembly are described below in conjunction with FIGS. 4 and 5.

The AV 110 also includes an onboard controller. The onboard controller controls operations and functionality of the AV 110. In embodiments where the AV 110 includes the delivery assembly, the onboard controller may control operations and functionality of the delivery assembly. In some embodiments, the onboard controller is a general-purpose computer, but may additionally or alternatively be any suitable computing device. The onboard controller is adapted for I/O communication with other components of the AV 110 (e.g., the onboard sensor suite, an UI module of the delivery assembly, etc.) and external systems (e.g., the online system 120). The onboard controller may be connected to the Internet via a wireless connection (e.g., via a cellular data connection). Additionally or alternatively, the onboard controller may be coupled to any number of wireless or wired communication systems.

The onboard controller processes sensor data generated by the onboard sensor suite and/or other data (e.g., data received from the online system 120) to determine the state of the AV 110. Based upon the vehicle state and programmed instructions, the onboard controller modifies or controls behavior of the AV 110. In some embodiments, the onboard controller implements an autonomous driving system (ADS) for controlling the AV 110 and processing sensor data from the onboard sensor suite and/or other sensors in order to determine the state of the AV 110. Based upon the vehicle state and programmed instructions, the onboard controller modifies or controls driving behavior of the AV 110.

An AV 110 may also include a rechargeable battery that powers the AV 110. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 110 is a hybrid electric vehicle that also includes an internal combustion engine for powering the AV 110, e.g., when the battery has low charge. In some embodiments, the AV 110 includes multiple batteries, e.g., a first battery used to power vehicle propulsion, and a second battery used to power AV hardware (e.g., the onboard sensor suite and the onboard controller 117). The AV 110 may further include components for charging the battery, e.g., a charge port configured to make an electrical connection between the battery and a charging station.

The online system 120 manages delivery services using the AVs 110. A delivery service is a delivery of one or more items from one location to another location. In some embodiments, a delivery service is a service for picking up an item from a location of a business (e.g., a grocery store, a distribution center, a warehouse, etc.) and delivering the item to a location of a customer of the business. In other embodiments, a delivery service is a service for picking up an item from a customer of the business and delivering the item to a location of the business, e.g., for purpose of returning the item.

The online system 120 may select an AV 110 from a fleet of AVs 110 to perform a particular delivery service and instruct the selected AV 110 to autonomously drive to a particular location. The online system 120 sends a delivery request to the AV 110. The delivery request includes information associate with the delivery service, e.g., information of a user requesting the delivery (e.g., location, identifying information, etc.), information of an item to be delivered (e.g., size, weight, or other attributes). In some embodiments, the online system 120 may instruct one single AV 110 to perform multiple delivery services. For instance, the online system 120 instructs the AV 110 to pick up items from one location and delivery the items to multiple locations, or vice versa. The online system 120 also manages maintenance tasks, such as charging and servicing of the AVs 110. As shown in FIG. 1, each of the AVs 110 communicates with the online system 120. The AVs 110 and online system 120 may connect over a public network, such as the Internet.

In some embodiments, the online system 120 may also provide the AV 110 (and particularly, onboard controller 145) with system backend functions. The online system 120 may include one or more switches, servers, databases, live advisors, or an automated voice response system (VRS). The online system 120 may include any or all of the aforementioned components, which may be coupled to one another via a wired or wireless local area network (LAN). The online system 120 may receive and transmit data via one or more appropriate devices and network from and to the AV 110, such as by wireless systems, such as 882.11x, GPRS, and the like. A database at the online system 120 can store account information such as subscriber authentication information, vehicle identifiers, profile records, behavioral patterns, and other pertinent subscriber information. The online system 120 may also include a database of roads, routes, locations, etc. permitted for use by AV 110. The online system 120 may communicate with the AV 110 to provide route guidance in response to a request received from the vehicle.

For example, based upon information stored in a mapping system of the online system 120, the online system 120 may determine the conditions of various roads or portions thereof. Autonomous vehicles, such as the AV 110, may, in the course of determining a navigation route, receive instructions from the online system 120 regarding which roads or portions thereof, if any, are appropriate for use under certain circumstances, as described herein. Such instructions may be based in part on information received from the AV 110 or other autonomous vehicles regarding road conditions. Accordingly, online system 120 may receive information regarding the roads/routes generally in real-time from one or more vehicles.

The online system 120 communicates with the client device 130. For instance, the online system 120 receives delivery requests from the client device 130. A delivery request is a request to deliver one or more items from a location to another location. The delivery request may include information of the items, information of the locations (e.g., store location, distribution center location, warehouse location, location of a customer, etc.), and so on. The online system 120 can provide information associated with the delivery request (e.g., information of the status of the delivery process) to the client device 130.

The client device 130 may be a device (e.g., a computer system) of a user of the online system 120. The user may be an entity or an individual. In some embodiments, a user may be a customer of another user. In an embodiment, the client device 130 is an online system maintained by a business, e.g., a retail business, a package service business, etc. The client device 130 may be an application provider communicating information describing applications for execution by the third-party device 140 or communicating data to the third-party device 140 for use by an application executing on the third-party device 140.

The third-party device 140 is one or more computing devices capable of receiving user input as well as transmitting and/or receiving data via the network. The third-party device 140 may be a device of an individual. The third-party device 140 communicates with the client device 130 to request delivery or return of items. For instance, the third-party device 140 may send a delivery request to the client device 130 through an application executed on the third-party device 140. The third-party device 140 may receive from the client device 130 information associated with the request, such as status of the delivery process.

In one embodiment, the third-party device 140 is a conventional computer system, such as a desktop or a laptop computer. Alternatively, a third-party device 140 may be a device having computer functionality, such as a personal digital assistant (PDA), a mobile telephone, a smartphone, or another suitable device. A third-party device 140 is configured to communicate via the network. In one embodiment, a third-party device 140 executes an application allowing a user of the third-party device 140 to interact with the online system 120. For example, a third-party device 140 executes a browser application to enable interaction between the third-party device 140 and the online system 120 via the network. In another embodiment, a third-party device 140 interacts with the online system 120 through an application programming interface (API) running on a native operating system of the third-party device 140, such as IOS® or ANDROID™.

Example Online System

Figure 2:
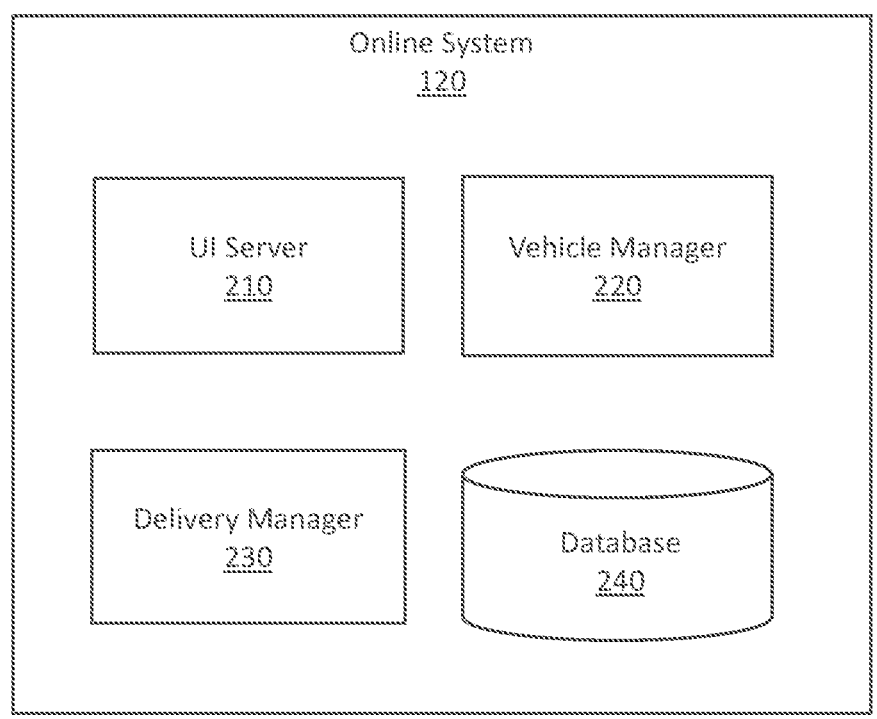
FIG. 2 is a block diagram illustrating an online system according to some embodiments of the present disclosure.

FIG. 2 is a block diagram illustrating the online system 120 according to some embodiments of the present disclosure. The online system 120 includes a UI server 210, a vehicle manager 220, a delivery manager 230, and a database 240. Alternative configurations, different or additional components may be included in the online system 120. Further, functionality attributed to one component of the online system 120 may be accomplished by a different component included in the online system 120 or a different system, e.g., the onboard controller of an AV 110.

The UI server 210 is configured to communicate with third-party devices (e.g., the third-party device 140) that provide a UI to users. For example, the UI server 210 may be a web server that provides a browser-based application to third-party devices, or the UI server 210 may be a mobile app server that interfaces with a mobile app installed on third-party devices. The UI enables the user to access a service of the online system 120, e.g., to request a delivery by using an AV 110.

The vehicle manager 220 manages and communicates with a fleet of AVs, e.g., the AVs 110. The vehicle manager 220 may assign AVs 110 to various tasks and direct the movements of the AVs 110 in the fleet. For example, the vehicle manager 220 assigns an AV 110 to perform a delivery service requested by a user through the UI server 210. The user may be associated with the client device 130. The vehicle manager 220 may instruct AVs 110 to drive to other locations while not servicing a user, e.g., to improve geographic distribution of the fleet, to anticipate demand at particular locations, to drive to a charging station for charging, etc. The vehicle manager 220 also instructs AVs 110 to return to AV facilities for recharging, maintenance, or storage.

The delivery manager 230 manages delivery services requested by users of the online system 120, e.g., a user associated with the client device 130. The delivery manager 230 processes a delivery request from a user and sends information in the delivery request to the vehicle manager 220 for the vehicle manager 220 to select an AV 110 meeting the need of the user. The delivery manager 230 may also monitor the process of a delivery service, e.g., based on the state of the AV 110 and the state of the delivery assembly in the AV 110. In some embodiments, the delivery manager 230 sends information of the delivery process to the client device 130 so that the user can be informed of the status of the delivery service. The delivery manager 230 may also analyze errors detected during the performance of the delivery service. The delivery manager 230 may assist to resolve the error. For example, the delivery manager 230 may determine a solution to fix the error. The solution may include an instruction to the onboard controller of the AV 110 or a person loading/unloading the item. As yet another example, the delivery manager 230 communicates the error to the client device 130 and requests the client device 130 to fix the error.

The database 250 stores data used, generated, received, or otherwise associated with the online system 120. For instance, the database 250 stores data associated with the AVs 110, data received from the client device 130, data associated with users of the online system 120, and so on.

Example Onboard Controller

Figure 3:
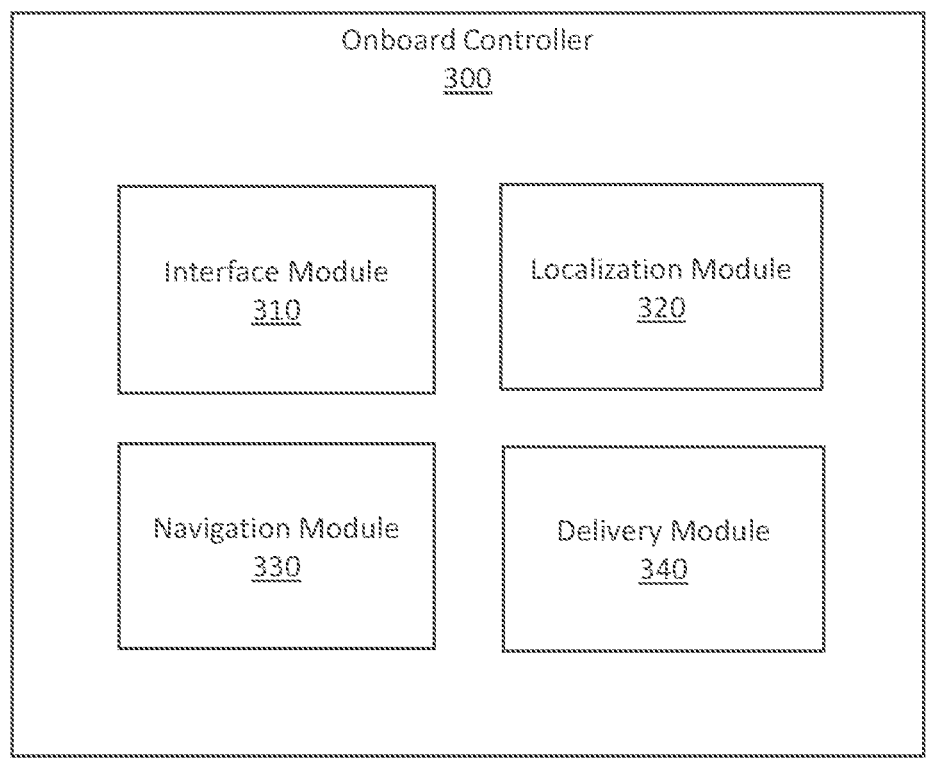
FIG. 3 is a block diagram illustrating an onboard controller of an AV according to some embodiments of the present disclosure.

FIG. 3 is a block diagram illustrating an onboard controller 300 of an AV 110 according to some embodiments of the present disclosure. The onboard controller 300 includes an interface module 310, a localization module 320, a navigation module 330, and a delivery module 340. Alternative configurations, different or additional components may be included in the onboard controller 300. Further, functionality attributed to one component of the onboard controller 300 may be accomplished by a different component included in the AV 110 or a different system, e.g., the online system 120.

The interface module 310 facilitates communications of the onboard controller 300 with other systems. For instance, the interface module 310 supports communications of the onboard controller 300 with other systems, e.g., the online system 120. The interface module 310 supports communications of the onboard controller 300 with other components of the AV 110, e.g., the onboard sensor suite, delivery assembly, or actuators in the AV 110. For instance, the interface module 310 may retrieve sensor data generated by the onboard sensor suite, communicate with an UI module of the delivery assembly, or send commands to the actuators. In an embodiment, the interface module 310 facilitates a local connection between the onboard controller 300 and the delivery assembly. The local connection may be a wired connection or local wireless connection, such as Bluetooth.

The localization module 320 localizes the AV 110. The localization module 320 may use sensor data generated by the onboard sensor suite to determine where the AV 110 is. The sensor data includes information describing an absolute or relative position of the AV 110 (e.g., data generated by GPS, GNSS, IMU, etc.), information describing features surrounding the AV 110 (e.g., data generated by a camera, RADRA, SONAR, LINAR, etc.), information describing motion of the AV 110 (e.g., data generated by the motion sensor), or some combination thereof. In some embodiments, the localization module 320 uses the sensor data to determine whether the AV 110 has entered a local area, such as a parking garage or parking lot where the AV 110 can be charged. In some other embodiments, the localization module 320 may send the sensor data to the online system 120 and receives from the online system 120 a determination whether the AV 110 has entered the local area.

In some embodiments, the localization module 320 determines whether the AV 110 is at a predetermined location (e.g., a destination of a delivery service). For instance, the localization module 320 uses sensor data generated by the onboard sensor suite (or a sensor in the onboard sensor suite) to determine the location of the AV 110. The localization module 320 may further compare the location of the AV 110 with the predetermined location to determine whether the AV 110 has arrived. The localization module 320 may provide locations of the AV 110 to the delivery module 340.

The localization module 320 can further localize the AV 110 within the local area. For instance, the localization module 320 determines a pose (position or orientation) of the AV 110 in the local area. In some embodiments, the localization module 320 localizes the AV 110 within the local area by using a model of the local area. The model may be a 2D or 3D representation of the surrounding area, such as a map or a 3D virtual scene simulating the surrounding area. In various embodiments, the localization module 320 receives the model of the local area from the online system 120. The localization module 320 may send a request for the model to the online system 120 and in response, receive the model of the local area. In some embodiments, the localization module 320 generates the request based on sensor data indicating a position or motion of the AV 110. For instance, the localization module 320 detects that the AV 110 is in the local area or is navigated to enter the local area based on the sensor data and sends out the request in response to such detection. This process can be dynamic. For example, the localization module 320 may send new request to the online system 120 as the AV 110 changes its position.

The localization module 320 may further localize the AV 110 with respect to an object in the local area. An example of the object is a building in the local area. The localization module 320 may determine a pose of the AV 110 in relative to the building based on features in the local area. For example, the localization module 320 retrieves sensor data from one or more sensors (e.g., camera, LIDAR, etc.) in the onboard sensor suite that detect the features. The localization module 320 uses the sensor data to determine the pose of the AV 110. The features may be lane markers, street curbs, driveways, and so on. A feature may be two-dimensional or three-dimensional.

The navigation module 330 controls motion of the AV 110. The navigation module 330 may control the motor of the AV 110 to start, pause, resume, or stop motion of the AV 110. The navigation module 330 may further control the wheels of the AV 110 to control the direction the AV 110 will move. In various embodiments, the navigation module 330 generates a navigation route for the AV 110 based on a location of the AV 110, a destination, and a map. The navigation module 330 may receive the location of the AV 110 from the localization module 320. The navigation module 330 receives a request to go to a location and generate a route to navigate the AV 110 from its current location, which is determined by the localization module 320, to the location. The navigation module 330 may receive the destination from the delivery module 340 or an external source, such as the online system 120, through the interface module 310.

The delivery module 340 manages autonomous delivery by the AV 110. Functionality attributed to the delivery module 340 may be accomplished by a different component of the autonomous delivery environment 100, such as the delivery assembly. In some embodiments, the delivery module 340 processes delivery requests received from the online system 120. The delivery module 340 may communicate with the localization module 320 and the navigation module 330 to navigate the AV 110 based on the delivery requests, e.g., to navigate the AV 110 to locations specified in the delivery request.

The delivery module 340 may monitor or control the delivery assembly in the AV 110. The delivery module 340 may determine a size limit of the delivery assembly, e.g., based on the size of the container in the delivery assembly. The delivery module 340 may further determine whether the item that the online system 120 requests the AV 110 to deliver ("requested item") can fit in the delivery assembly based on the size limit. In embodiments that the delivery module 340 determines that the requested item has a size larger than the size limit of the delivery assembly, the delivery module 340 may communicate with the online system 120 to cancel or change the delivery request.

In some embodiments, the delivery module 340 uses sensor data generated by sensors in the delivery assembly to determine the state of an item in the delivery assembly. For instance, the delivery module 340 detects whether the item has been removed from the container or placed into the container by using sensor data generated by a sensor associated with the container. In some embodiments, the delivery module 340 uses the sensor data to determine whether the item matches a description in the delivery request to ensure that the item being remove or placed is the right item. The delivery module 340 may also determine a physical condition of the item.

The delivery module 340 may also manage a UI module of the delivery assembly. For instance, the delivery module 340 generates indicators based on the state of the item or the delivery process and instructs the UI module to provide the indicators to the user. An indicator may be light, text, sound, or some combination thereof. An indicator may inform the user of the state of the item or the delivery process or provide an instruction to the user. In an embodiment, the delivery module 340 generates textual or audio messages and instructs the UI module to display the textual or audio messages. In another embodiment, the delivery module 340 turns on a light on the UI module. The delivery module 340 may also control the delivery assembly based on user input received through the UI module. For example, the delivery module 340 changes a position of a receptacle or divider in the delivery assembly based on the user's interaction with the UI module. The delivery module 340 may command an actuator to change the position of the receptacle or divider. As another example, the delivery module 340 authenticates an identity of the user based on identification information received from the user through the UI module. The delivery module 340 may provide the user access to the container after the identity authentication.

In some embodiments, the delivery module 340 also monitors or controls other components (e.g., a door) of the AV 110 to facilitate autonomous delivery. In some embodiments, after the AV 110 arrives at a delivery location, the delivery module 340 provides the user an access to the container through a door of the AV 110. In an embodiment, the door is at the curbside of the AV 110, as opposed to the traffic side of the AV 110, when the AV 110 parks on a street. The delivery module 340 may command an actuator of the door to open the door after the localization module 320 determines that the AV 110 has arrived at the delivery location. The delivery module 340 may also command the actuator to close the door after the user finished loading or unloading the item. For instance, the delivery module 340 determines a position of the user relative to the door, e.g., by using sensor data generated by a sensor associated with the door, and the delivery module 340 commands the actuator to close the door based on the determined position, e.g., the determined position indicates that it is safe to the user to close the door. The delivery module 340 may also use sensor data to monitor whether the door is open or closed. The delivery module 340 may instruct the navigation module 330 to resume motion of the AV 110 after the door is closed.

In some embodiments, the delivery module 340 detects and processes errors occurred during the delivery. For example, the delivery module 340 may detect that the item removed or placed by the user does not match the description of the requested item in the delivery request. For instance, the delivery module 340 may detect that the item does not match the weight of the requested item in the delivery request. After such a detection, the delivery module 340 may send an error message to the UI module to inform the user of the error. The delivery module 340 may also analyze an error, determine a solution to the error, and provide the user an instruction to fix the error through the UI module, Additionally or alternatively, the delivery module 340 may report the error to the online system 120 and request the online system 120 to provide a solution to the error.

Example Delivery Assembly

Figure 4:
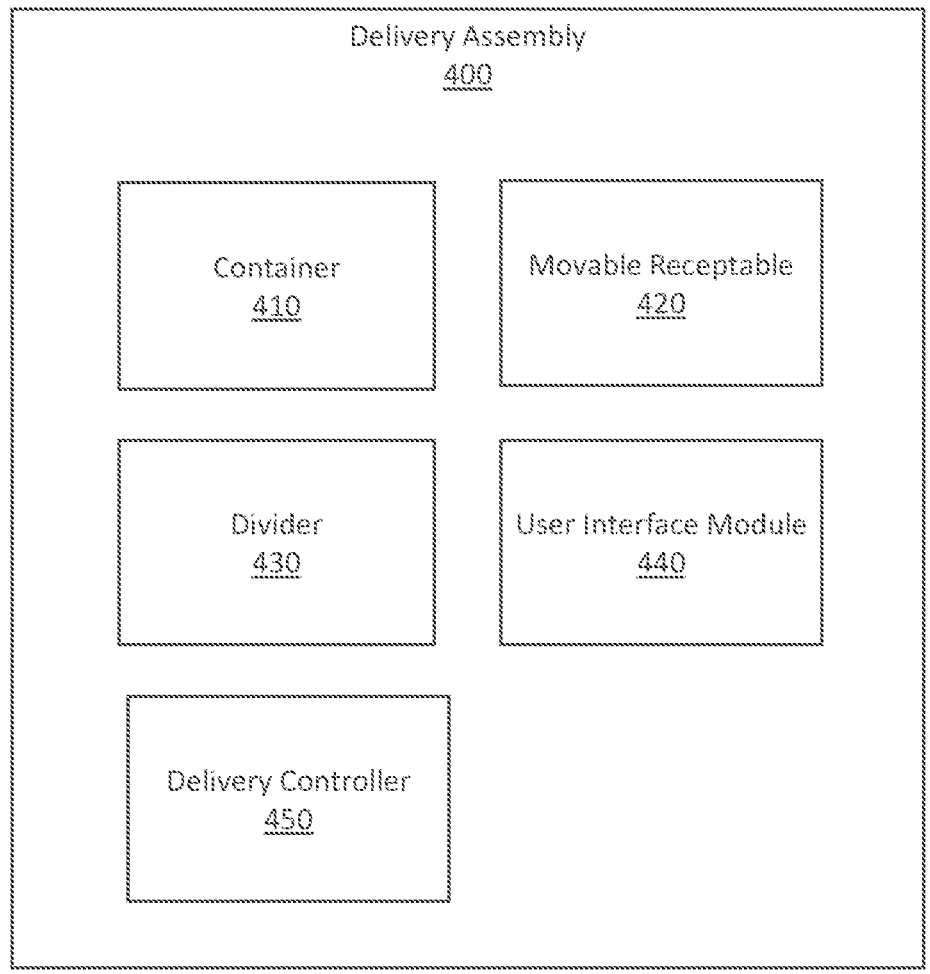
FIG. 4 is a block diagram illustrating a delivery assembly of an AV according to some embodiments of the present disclosure.

FIG. 4 is a block diagram illustrating a delivery assembly 400 of an AV 110 according to some embodiments of the present disclosure. The delivery assembly 400 includes a container 410, a movable receptacle 420, a divider 430, a UI module 440, and a delivery controller 450. Alternative configurations, different or additional components may be included in the delivery assembly 400. For instance, some embodiments of the delivery assembly 400 do not include the movable receptacle 420 or the divider 430. Further, functionality attributed to one component (e.g., the delivery controller 450) of the delivery assembly 400 may be accomplished by a different component (e.g., the onboard controller 300) included in the AV 110 or a different system, e.g., the online system 120.

The container 410 provides space and securement of items delivered by the AV 110. The container 410 may have various sizes, shapes, or configurations to facilitate delivery of different types of items. In some embodiments, the container 410 has a size limit and is used for delivering items that is not larger than the size limit. The container 410 may hold one or more items for one single user or multiple users. The container 410 also provides users access to the items placed therein. In an embodiment, the container 410 includes an opening through which users can reach the items. The opening may be blocked, e.g., during motion of the AV 110 or before the identity of the user is authenticated.

The container 410 is secured to the AV 110, e.g., to one or more seats in the AV 110, and secures the items placed therein. For instance, the container 410 has a configuration that prevents the items from being damaged or being moved out of the container 410 during navigation of the AV 110. The container 410 may maintain a physical condition (e.g., temperature) of the items. In an embodiment, the container 410 may maintain temperatures above or below the room temperature.

In some embodiments, the container 410 has a structure facilitating the other components of the delivery assembly. For example, the container 410 may include tracks on which the movable receptacle 420 can move inside the container. As another example, the container 410 may include a hinge for flipping up or down the divider 430. The container 410 may also provide space and securement for the UI module 440. In some embodiments, the container 410 also provides space and securement for actuators that can drives the movement of the movable receptacle 420 or the divider. More details regarding the container 410 are described below in conjunction with FIGS. 5 and 6.

The container 410 may include one or more sensors detecting state of items placed in the container. For instance, the container 410 includes a sensor detecting whether the items are present in the container 410. The sensor may be a weight sensor, a camera, other types of sensors, or some combination thereof. The container 410 may also include one or more sensors detecting physical conditions (e.g., temperature, humidity, etc.) of the items in the container 410.

The movable receptacle 420 is movably attached to the container 410. The movable receptacle 420 provides space for one or more items. An item can be placed directly in the container 410 or in the movable receptacle 420. In embodiments where multiple items are delivered, the movable receptacle 420 facilitates placement and removal of the items from a safer side of the vehicle, e.g., from the curb side of the vehicle. In a process of picking up multiple items from a user, the user can place an item in the movable receptacle 420 through the vehicle door at the curb side, then move the movable receptacle 420 away from the vehicle door and place another item directly in the container 410. In a process of delivering multiple items to a user, the user can remove the item placed directly in the container 410 first, then move the movable receptacle 420 towards the vehicle door and remove the item in the movable receptacle 420. In some embodiments, the movable receptacle 420 may be moved inside the container 410. For instance, the movable receptacle 420 is movably attached to one or more sliding tracks in the container 410 and can slide along the sliding tracks. The movable receptacle 420 can be moved automatically (e.g., driven by an actuator in accordance with a command from the delivery controller 450) or manually. Examples of the movable receptacle 420 includes sliding bin, jogging tray, etc. One or more of the sensors in the container may be placed in the movable receptacle 420 to detect the state of the item in the movable receptacle 420. More details regarding the movable receptacle 420 are described below in conjunction with FIG. 5.

The divider 430 is inside the container 410 and divides the container 410 into multiple sections. The divider 430 can be used when the AV 110 delivers items to multiple users. For instance, the first user's item can be put in the first section of the container 410 and the second user's item can be put in the second section of the container 410. The divider 430 blocks the first user from accessing the second user's item or even from viewing the second user's items so that the second user's privacy can be protected. The divider 430 can be flipped up and down to block or provide access to the space behind the divider 430. The divider 430 may also be used to facilitate securement of one or more items during navigation of the AV 110. For instance, the divider 430 may prevent an item from falling off during navigation of the AV 110. In a pickup process, the divider 430 can be raised after the first user loads his/her items but before the second user has access to the container 410. Similarly, in a delivery process, the divider 430 can be flipped down after the first user unloads his/her items and loses access to the container 410. More details regarding the divider 430 are described below in conjunction with FIG. 6.

The UI module 440 provides a user interface to provide users information associated with loading or unloading items. For instance, the UI module 440 informs the user of the state of the item in the container 510 (e.g., the item is ready for being picked up, the item has been picked up, the item has been collected, etc.), the state of the AV 110 (e.g., a door is open, a door is to be closed, etc.), actions to be taken by the user (e.g., moving the sliding bin 520, unloading an item, loading an item, closing a door of the AV 110, etc.), and so on. The UI module 440 may provide information to users through indicators generated by the UI module 440. An indicator may be light, text, sound, or some combination thereof. The UI module 440 may also include components that the users can interact with. For instance, the UI module 440 includes a button, which the user can press to change the position of the sliding bin 520. The UI module 440 may also include a component that allows the user to input information. For instance, the UI module 440 may include a camera or scanner to capture identification information from the user. More details regarding the UI module 440 are described below in conjunction with FIGS. 7A-E, 8A-B, and 9-11.

The delivery controller 450 manages autonomous delivery by the delivery assembly 400 and controls the other components of the delivery assembly 400. The delivery controller 450 may control users' access to the container 410. In some embodiments, the delivery controller 450 may communicate with the onboard controller of the AV 110 to open the curbside door of the AV 110. Additionally or alternatively, the delivery controller 450 may provide an indicator to the user, e.g., through the UI module 440, to inform the user to use the curbside door. The indicator may be light, sound, text, or some combination thereof. In an example, the delivery controller 450 turns on a light associated with the curbside door to inform the user to use the curbside door to get access to the container 410. The delivery controller 450 may detect ambient lightening condition (e.g., level of brightness of the environment) and keep the light on during the delivery or pickup process after it detects that the ambient lightening condition is poor.

In some embodiments, the delivery assembly 400 may verify a user's identity before it provides the user access to the container 410. For instance, the delivery controller 450 instructs the UI module 440 to inform the user to provide identification information. The delivery controller 450 processes the user's identification information received by the UI module 440 and authenticates the user's identity. The delivery assembly 400 may authenticate the user's identity by verifying the authenticity of the identification information (e.g., authenticity of an ID card) or verifying whether the received identification information matches the corresponding information of the user that has been received from the user in advance, e.g., through the online system 120 and the onboard controller of the AV 110. After the delivery controller 450 provides the access to the user, the delivery controller 450 instructs the UI module 440 to inform the user to load or unload an item.

In a pickup process, the delivery controller 450 may provide the user access to the movable receptacle 420 first. For instance, the delivery controller 450 commands the UI module 440 to inform the user to move the movable receptacle 420 towards the curbside door of the AV 110. After the user has the movable receptacle 420 moved, either automatically or manually, the delivery controller 450 may command the UI module 440 to instruct the user to place an item into the movable receptacle 420.

In some embodiments, the delivery controller 450 processes sensor data generated by sensors in the container 410 and movable receptacle 420 to detect the state of an item in the container 410, e.g., whether the item is present in the container 410 or movable receptacle 420, physical conditions of the item, etc. The delivery controller 450 may also detect errors occurred during the autonomous delivery based on the sensor data. The delivery controller 450 may instruct the UI module 440 to inform the user of the state of the items or errors. The delivery controller 450 may also instruct the user to provide input based on the state of the item, e.g., input indicating whether to move the movable receptacle 420 or divider 430. The delivery controller 450 may command an actuator to move the movable receptacle 420 or divider 430 based on the user's input.

In an example of a delivery process, the delivery controller 450 retrieves first sensor data generated by a sensor associated with the container 410 and detects, based on the first sensor data, removal of an item from the container 410. In response to detecting the removal of the first item, the delivery controller 450 instructs the UI module 440 to instruct the user to move the movable receptacle 420 towards the curbside door of the AI 110. After the UI module 440 provides the instruction to the user, the delivery controller 450 retrieves second sensor data generated by a sensor associated with the movable receptacle 420. The delivery controller 450 detected, based on the first sensor data, removal of the second item from the movable receptacle 420 and afterwards instructs the UI module 440 to instruct the user to close the curbside door of the AV 110.

In an example of a pickup process, the delivery controller 450 retrieves first sensor data generated by a sensor associated with the movable receptacle 420 and detects, based on the first sensor data, placement of a first item into the movable receptacle 420. In response to detecting the placement of the first item, the delivery controller 450 instructs the UI module 440 to instruct the user to move the movable receptacle 420 away from the curbside door of the AI 110. After the UI module 440 provides the instruction to the user, the delivery controller 450 retrieves second sensor data generated by a sensor associated with the container 410. The delivery controller 450 detected, based on the second sensor data, placement of the second item into the container 410 and afterwards instructs the UI module 440 to instruct the user to close the curbside door of the AV 110.

The delivery controller 450 may detect the current position of the movable receptacle 420 and determine whether or not the movable receptacle 420 needs to be repositioned. For example, the delivery controller 450 determines whether the movable receptacle 420 is at a desired position that a user may place items into or remove item from the movable receptacle 420 through the curbside door of the AI 110. As another example, the delivery controller 450 determines whether the movable receptacle 420 is at a desired position that a user may place items into or remove item directly from the container 410 (outside the movable receptable 420) through the curbside door of the AI 110. In an embodiment where the delivery controller 450 determines that the movable receptacle 420 is not at the desired position, the delivery controller 450 can automatically change the position of the movable receptacle 420 to the desired position or instruct the UI module 440 to inform the user to move the movable receptacle 420 to the desired position. Additionally or alternatively, the delivery controller 450 may automatically reset the position of the movable receptacle 420 after a delivery or pickup processes is completed. For instance, after the delivery controller 450 determines that a user has removed all the items from the movable receptacle 420 during a delivery process, the delivery controller 450 may move the movable receptacle 420 away from the curbside door of the AV 110.

In some embodiments, the delivery controller 450 communicates with the onboard controller, e.g., through a local connection. Some or all of the functionality attributed to the delivery controller 450 may be accomplished by the onboard controller of the AV 110. For example, the delivery controller 450 may send the sensor data generated by the sensors associated with the container 410 to the onboard controller and requests the onboard controller to detect the state of the items or instruct the UI module 440 to provide indicators to the user. The delivery controller 450 may provide information regarding the status of the delivery service (e.g., information indicating completion of a delivery or pickup process, information describing an error in a delivery or pickup process, etc.) to the onboard controller for the onboard controller to change state of the AV 110 or to communicate with the online system 120. As another example, the delivery controller 450 may receive information about the delivery service (e.g., information of the user and item) from the onboard controller to determine whether the delivery or pickup process has any error.

Figure 5:
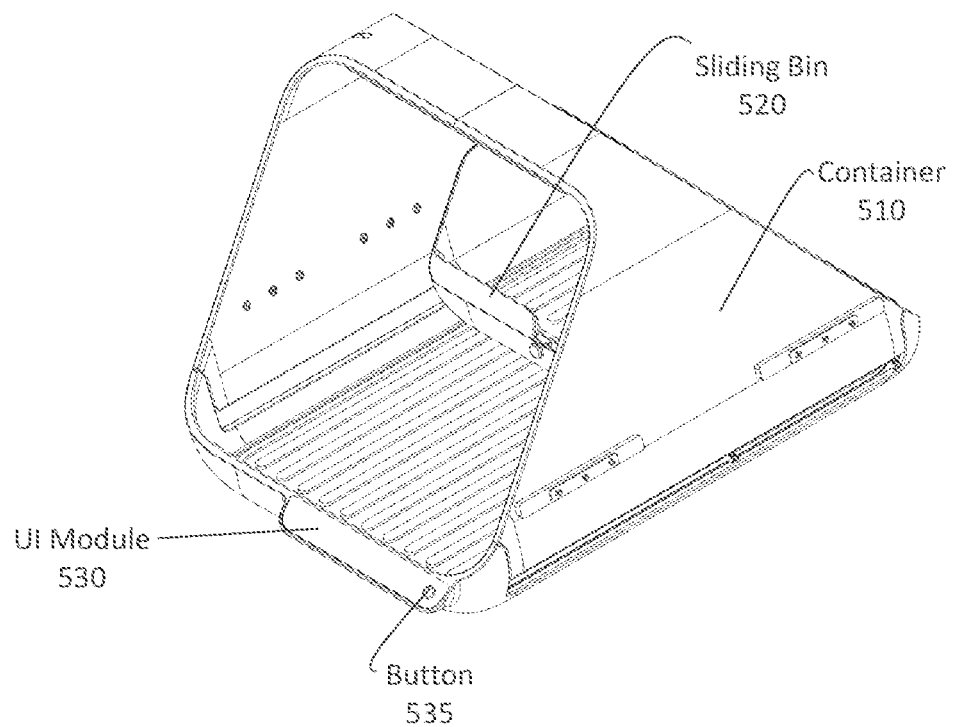
FIG. 5 illustrates an example delivery assembly according to some embodiments of the present disclosure.

FIG. 5 illustrates an example delivery assembly 500 according to some embodiments of the present disclosure. The delivery assembly 500 includes a container 510, a sliding bin 520, and a UI module 530. In some embodiments, the delivery assembly 500 may include different components. For instance, the delivery assembly 500 may include a frame configured to be attached on the container 510 and to secure the container to an AV 110.

The container 510 is an embodiment of the container 410 in FIG. 4. The container 510 in FIG. 5 is a partially open box. In other embodiments, the container 510 may have other configurations. For example, the container 510 may be a closed box or a fully open box. The container 510 may also include a shelf, a drawer, a cabinet, or other types of storage components. The container 510 may have a size that fits one or more seats in the AV 110. In some embodiments, the container 510 has a size that fits the backrow of the AV 110. The container may be made of a plastic material, metal, other types of materials, or some combination thereof. In some embodiments, the container 510 has a size limit and the size of an items delivered by using the container does not exceed the size limit. The container 510 may have a frame that can be secured to one or more seats in the AV 110.

The sliding bin 520 is movably attached to the container 510. In FIG. 5, the sliding bin 520 is arranged inside the container 510 and coupled to two sliding tracks in the container 510. The sliding bin 520 facilitates loading/unloading multiple items in the container 510. A user may move the sliding bin 520 to get an access to an item placed in the sliding bin 520 without walking to the other side of the AV 110. This may be important to the safety of the user. In some embodiments, the sliding bin 520 is automatic. The onboard controller of the AV 110 may command an actuator to change the position of the sliding bin 520 relative to the curbside door. The sliding bin 520 is an embodiment of the movable receptacle 420 in FIG. 4.

The UI module 530 provides a user interface to provide users information associated with loading or unloading items. For instance, the UI module 530 informs the user of the state of the item in the container 510 (e.g., the item is ready for being picked up, the item has been picked up, etc.), the state of the AV 110 (e.g., a door is open, a door is to be closed, etc.), actions to be taken by the user (e.g., moving the sliding bin 520, unloading an item, loading an item, closing a door of the AV 110, etc.), and so on. The UI module 530 may provide information to users through indicators generated by the UI module 530. An indicator may be light, text, sound, or some combination thereof.

The UI module 530 may also include components that the users can interact with. For instance, the UI module 530 includes a button 535, which the user can press to move the sliding bin 520, e.g., move relative to the curbside door of the AV 110. In an example, the UI module 530 informs the user that the sliding bin 520 can be moved by pushing the button 535, e.g., by illuminating the button. The UI module 530 may also include a component that allows the user to input information. For instance, the UI module 530 may include a camera or scanner to capture identification information from the user. The UI module 530 is an embodiment of the UI module 440 in FIG. 4.

Figure 6:
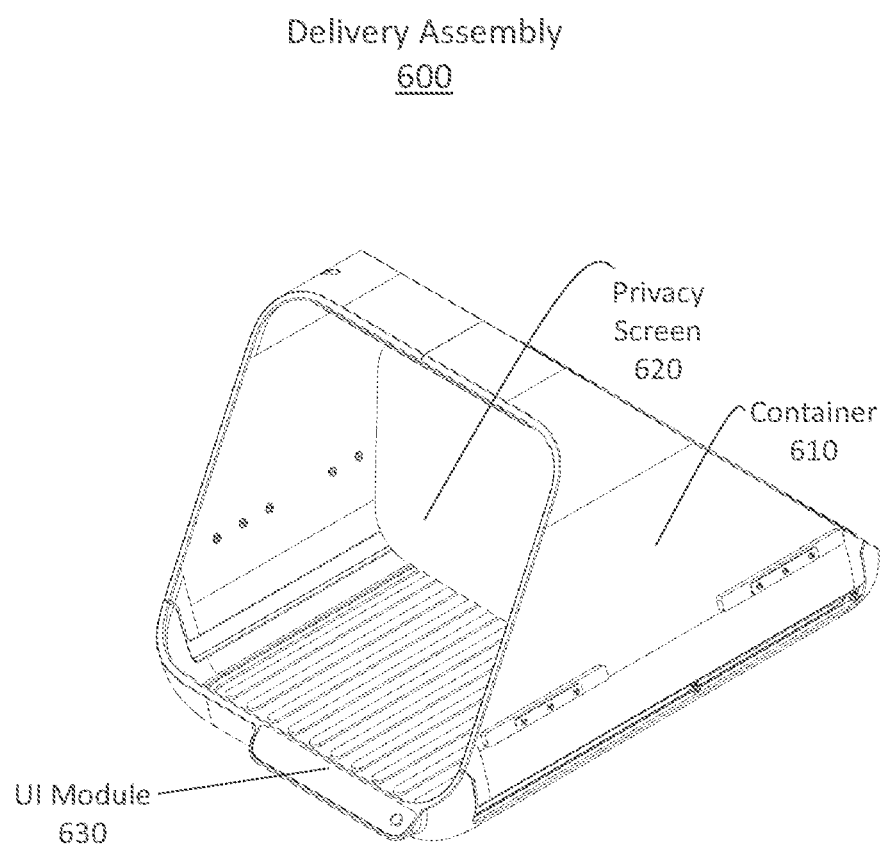
FIG. 6 illustrates another example delivery assembly according to some embodiments of the present disclosure.
Figure 7E:
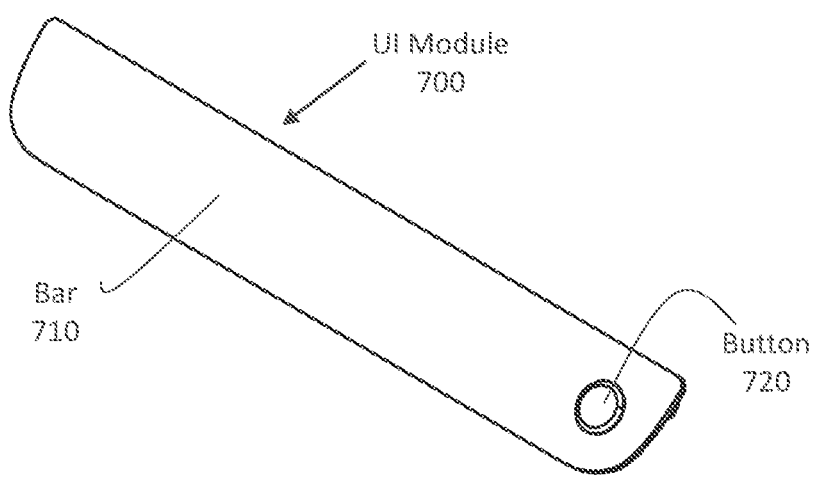

FIG. 6 illustrates another example delivery assembly 600 according to some embodiments of the present disclosure. The delivery assembly 600 includes a container 610, a divider 620, and a UI module 630. In some embodiments, the delivery assembly 400 may include different components. For example, the delivery assembly 600 may include a frame configured to be attached on the container 610 and to secure the container to an AV 110. As another example, the delivery assembly 600 also includes a movable receptacle, e.g., the sliding bin 520 in FIG. 5. The container 610 is similar to the container 410 in FIG. 4, and the UI module 630 is similar to the UI module 440 in FIG. 4. The UI modules 430 and 630 have a shape that is similar to rectangular and are located at the bottom of the container 410. In other embodiments, the UI module 440 or 630 may have a different shape or location.

The divider 620 is inside the container 610 and divides the container 610 into two sections. The divider 620 is an embodiment of the divider 430 in FIG. 4. The divider 620 may be partially or fully opaque to protect user privacy in embodiments where the AV 110 is used to deliver items to multiple users. For instance, the item for the first user can be placed in the first section of the container 610, and the item for the second user can be placed in the second section of the container 610. When the first user unloads the first item from the container 610, the second item is invisible, or maybe even inaccessible, to the first user as the second item is behind the divide 620. After the first user finishes unloading the first item (e.g., after the AV 110 closes the door and leaves the location of the first user) or when the second item can be picked up by the second user (e.g., after the AV 110 arrives at the location of the second user), the onboard controller of the AV 110 may command an actuator to flip down the divider 620 to make the second item visible and accessible to the second user. In some embodiments, a sliding bin is present in the second section of the container 610 and the sliding bin can be moved towards the curbside door of the AV 110 to provide the second user a safe access to the second item.

Example UI Module

FIGS. 7A-E are various views of a UI module 700 according to some embodiments of the present disclosure. FIGS. 7A-7D are different views of the UI module 700. The UI module 700 may be an embodiment of the UI module 440 or 530 described above. The UI module 700 includes a bar 710 and a button 720. The bar 710 may be fixed on a container, e.g., the container 410 or 510, by using the coupling elements 730 and 740.

The button 720 may be a controller of a movable receptacle (e.g., the sliding bin 520) or a divider (e.g., the divider 620). A user may push the button 720 to move the movable receptacle or divider. In some embodiments, the button 720 has an active state and an inactive state. The button 720 can control the movement of the movable receptacle or divider in the active state but cannot do so in the inactive state. The button 720 may be associated with a light emitter that illuminates (e.g., back lights) the button 720 when the button 720 is in the active state to provide an indicator to the user that the button 720 is active.

Figure 8A:
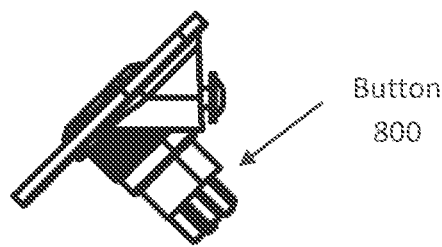
FIGS. 8A-B illustrate an example button of the UI module according to some embodiments of the present disclosure.
Figure 8B:
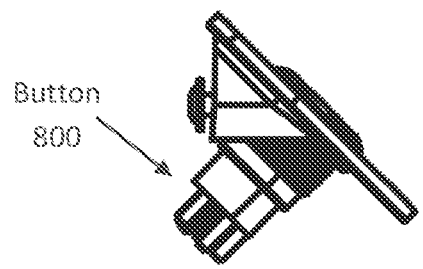

FIGS. 8A-B illustrate an example button 800 of the UI module 700 according to some embodiments of the present disclosure. FIGS. 8A-B are two different views of the example button 800. The example button 800 may be an embodiment of the button 720 in FIGS. 7A-E.

Figure 9:
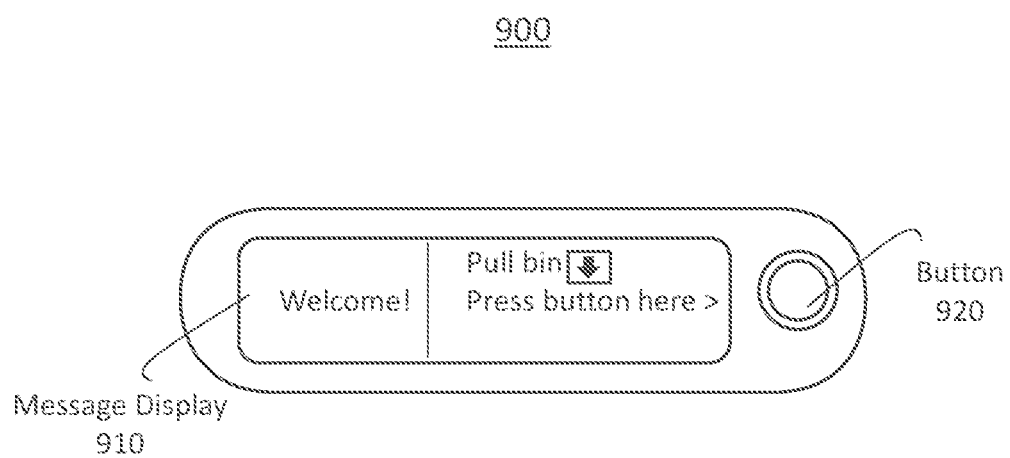
FIG. 9 illustrates a UI according to some embodiments of the present disclosure.

FIG. 9 illustrates a UI 900 according to some embodiments of the present disclosure. The UI 900 is supported by a UI module (e.g., the UI module 530, 630, or 700) of a delivery assembly (e.g., the delivery assembly 400, 500, or 600) in an AV 110. The UI 900 provides an interface to users for receiving information and providing input. The UI 900 includes a message display 910 and a button 920. In other embodiments, the UI 900 may include other components.

The message display 910 displays textual indicators to the user. A textual indicator provides information associated with loading or unloading an item. For instance, a textual indicator informs the user that the item is ready to be picked up, the item has been picked up, the delivery has been completed, an error is detected, and so on. The textual indicator may also provide the user instructions, e.g., an instruction of how to move a receptacle movably attached to the container. In FIG. 9, the message display 910 displays a greeting message ("Welcome!") and an instruction to move the receptacle by either pull the receptacle or press the button. In other embodiments, the message display 910 may display other messages to the user. The button 920 may be the button 720.

Figure 10:
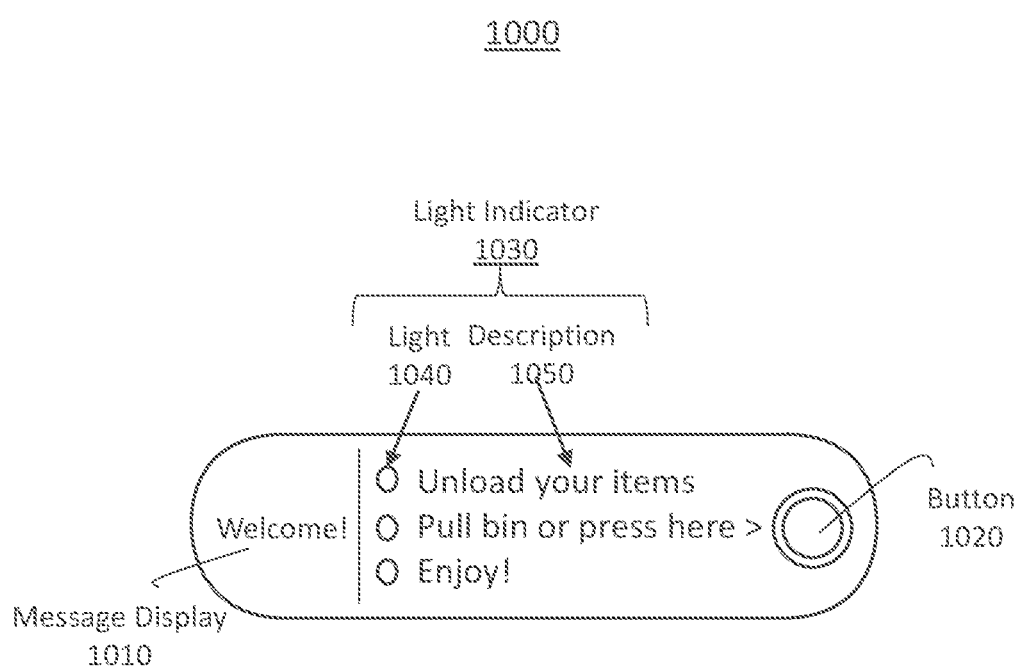
FIG. 10 illustrates another UI according to some embodiments of the present disclosure.

FIG. 10 illustrates another UI 1000 according to some embodiments of the present disclosure. The UI 1000 is supported by a UI module (e.g., the UI module 530, 630, or 700) of a delivery assembly (e.g., the delivery assembly 400, 500, or 600) in an AV 110. The UI 1000 provides an interface to users to receive information and provide input. The UI 1000 includes a message display 1010, a button 1020, and light indicators 1030. In other embodiments, the UI 1000 may include other components.

The message display 1010 displays a message ("Welcome!"). The button 1020 may be the button 720. The light indicators 1030 provides information of the loading or unloading process to users. FIG. 10 shows three light indicators 1030 (individually referred to as "light indicator 1030" and collective referred to as "light indicators 1030"). In other embodiments, the UI 1000 may include a different number of light indicators 1030. An individual light indicator 1030 includes a light 1040 and a description 1050. The description 1050 indicates a step of a loading or unloading process. FIG. 10 illustrates example steps of an unloading process, the descriptions 1050 of the three light indicators 1030 are "unload your item," "pull receptacle or press here >," and "Enjoy!". In other embodiments, the light indicators 1030 may provide description of different steps. When the unloading process is at a particular step, the light 1040 corresponding to the description of the particular step is on and the other lights 1040 are off. In some embodiments, the lights 1040 are light emitting diodes (LEDs). The lights 1040 may have different colors. For instance, the light 1040 for the description 1050 saying "Enjoy!" is green, versus the light 1040 for the description 1050 saying "pull receptacle or press here >" is red. The color of a light 1040 may change. For instance, the light 1040 for the description 1050 saying "pull receptacle or press here >" may change from red to green after the user pulls the receptacle or presses the button 1020.

Figure 11:
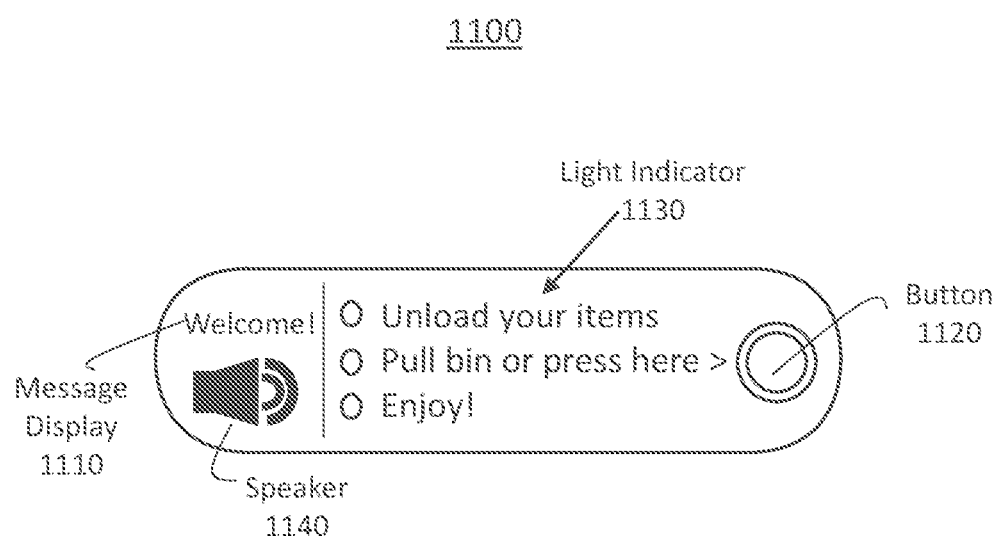
FIG. 11 illustrates yet another UI according to some embodiments of the present disclosure.

FIG. 11 illustrates yet another UI 1100 according to some embodiments of the present disclosure. The UI 1100 is supported by a UI module (e.g., the UI module 530, 630, or 700) of a delivery assembly (e.g., the delivery assembly 400, 500, or 600) in an AV 111. The UI 1100 provides an interface to users to receive information and provide input. The UI 1100 includes a message display 1111, a button 1120, light indicators 1130, and a speaker 1140. In other embodiments, the UI 1100 may include other components.

The message display 1111, button 1120, and light indicators 1130 may be similar to the message display 911, button 920, and light indicators 930 in FIG. 9. The speaker 1140 provides audio to inform user's status of the load or unload process. In some embodiments, the content of the audio is the same as the description in the light indicators 1130 and the audio may be played to the user in synchronization with the lights in the light indicators 930. In other embodiments, the speaker 1140 may provide other information to the users, e.g., information notifying the users a detection of an error, information assisting the users to resolve an error, and so on. The UI 1100 may provide interactive elements that the users can choose to change volume of the speaker 1140, mute the speaker 1140, or turn the speaker 1140 on.

Example Delivery Process

Figure 12:
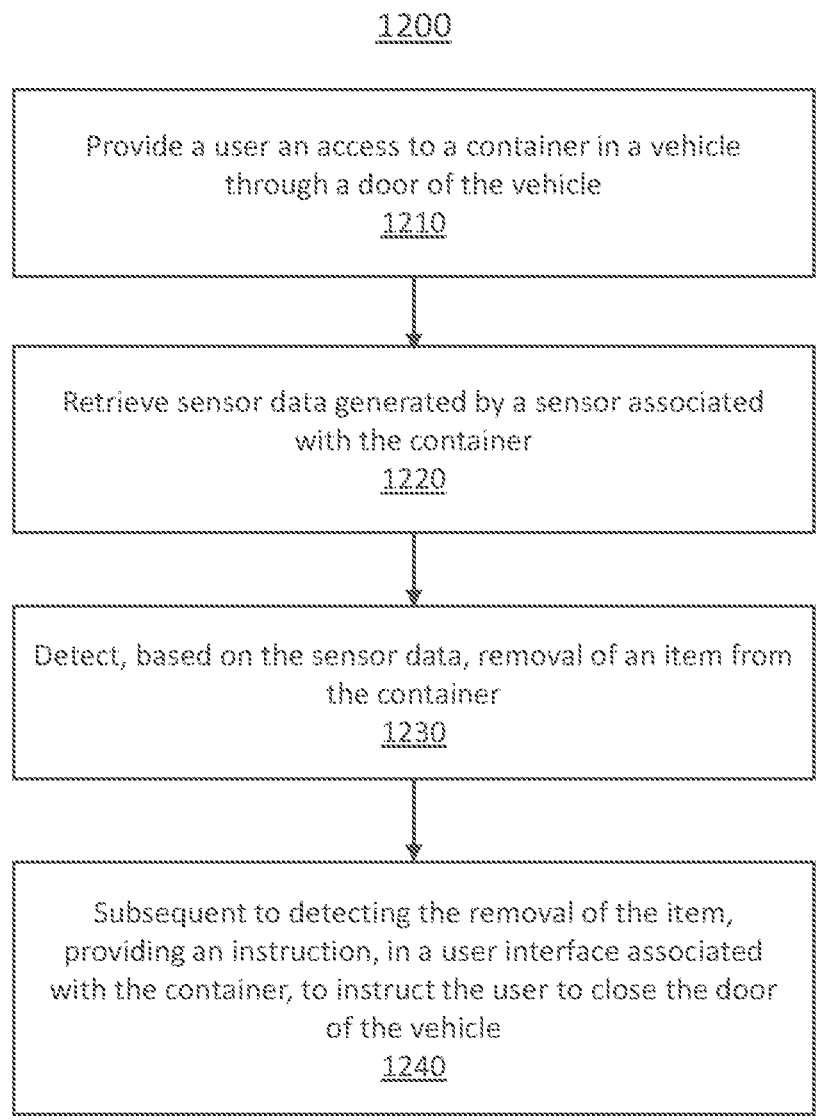
FIG. 12 is a flowchart showing a process of delivering an item to a user by using an AV 110 according to some embodiments of the present disclosure.

FIG. 12 is a flowchart showing a process 1200 of delivering an item to a user by using an AV 110 according to some embodiments of the present disclosure. The process 1200 may be performed by a delivery assembly of an AV 110, e.g., the delivery assembly 400. Although the process 1200 is described with reference to the flowchart illustrated in FIG. 12, many other processes of autonomously delivering items may alternatively be used. For example, the order of execution of the steps in FIG. 12 may be changed. As another example, some of the steps may be changed, eliminated, or combined.

The delivery assembly 400 provides, in 1210, a user an access to a container in a vehicle through a door of the vehicle. The delivery assembly 400 retrieves, in 1220, sensor data generated by a sensor associated with the container. The delivery assembly 400 detects, in 1230, based on the sensor data, removal of an item from the container. Subsequent to detecting the removal of the item, the delivery assembly 400 provides, in 1240, an instruction, in a user interface associated with the container, to instruct the user to close the door of the vehicle. The delivery assembly 400 may provide the instruction through an indicator in the user interface. An indicator in the user interface can be light, text, sound, or some combination thereof.

Figure 13:
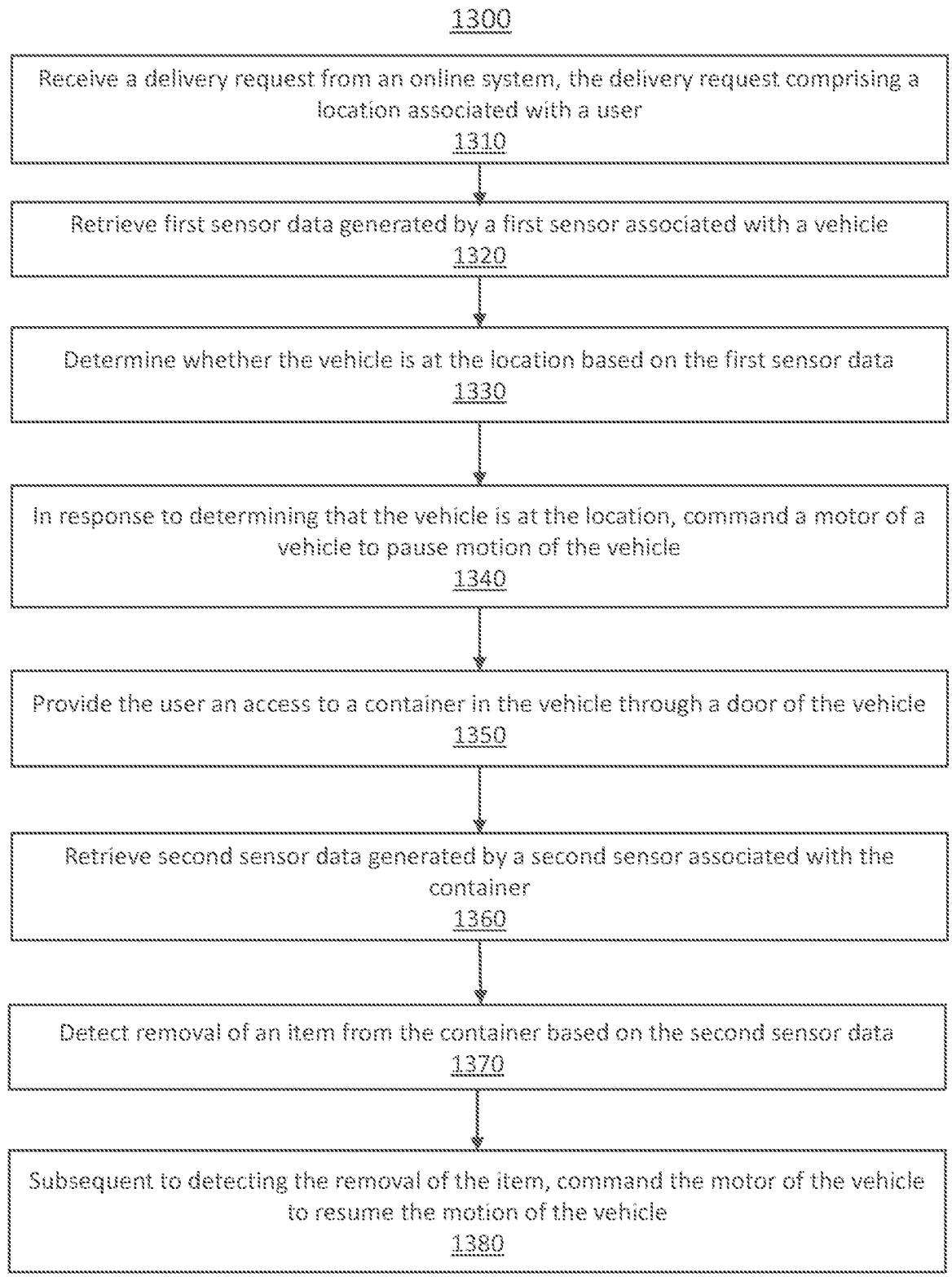
FIG. 13 is a flowchart showing another process of delivering an item to a user by using an AV 110 according to some embodiments of the present disclosure.

FIG. 13 is a flowchart showing another process 1300 of delivering an item to a user by using an AV 110 according to some embodiments of the present disclosure. The process 1300 may be performed by an onboard controller of an AV 110, e.g., the onboard controller 300. Although the process 1300 is described with reference to the flowchart illustrated in FIG. 13, many other processes of autonomously delivering items may alternatively be used. For example, the order of execution of the steps in FIG. 13 may be changed. As another example, some of the steps may be changed, eliminated, or combined.

The onboard controller 300 receives, in 1310, a delivery request from an online system. The delivery request includes a location associated with a user. The onboard controller 300 retrieves, in 1320, first sensor data generated by a first sensor associated with a vehicle. The onboard controller 300 determines, in 1330, whether the vehicle is at the location based on first sensor data generated by a first sensor associated with a vehicle. In response to determining that the vehicle is at the location, the onboard controller 300 commands, in 1340, a motor of the vehicle to pause motion of the vehicle. The onboard controller 300 provides, in 1350, the user an access to a container in the vehicle through a door of the vehicle. The onboard controller 300 retrieves, in 1360, second sensor data generated by a second sensor associated with the container. The onboard controller 300 detects, in 1370, removal of an item from the container based on the second sensor data. Subsequent to detecting the removal of the item, the onboard controller 300 commands, in 1380, the motor of the vehicle to resume the motion of the vehicle.

Figure 14:
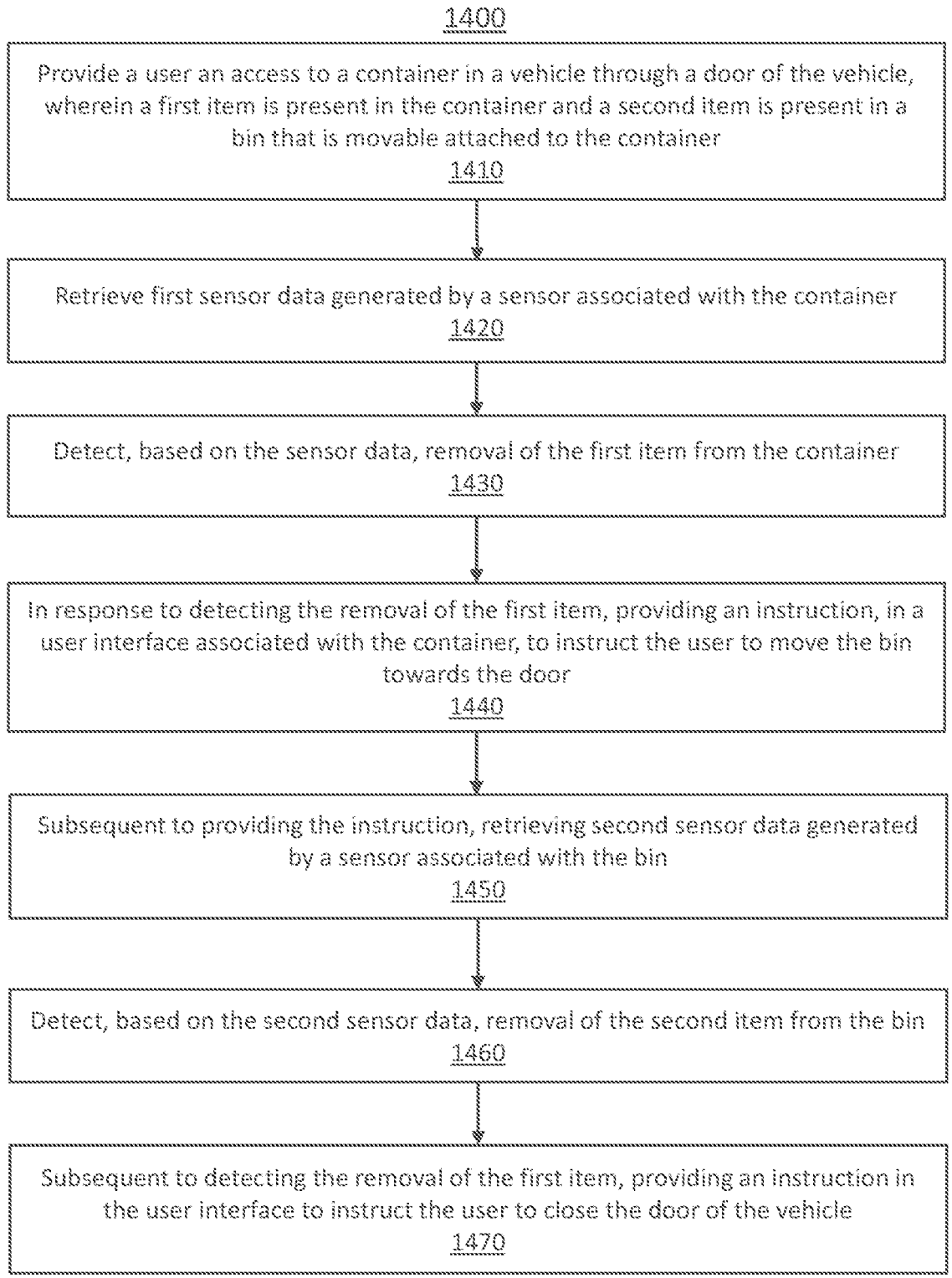
FIG. 14 is a flowchart showing yet another process of delivering an item to a user by using an AV 110 according to some embodiments of the present disclosure.

FIG. 14 is a flowchart showing yet another process 1400 of delivering an item to a user by using an AV 110 according to some embodiments of the present disclosure. The process 1400 may be performed by a delivery assembly of an AV 110, e.g., the delivery assembly 400. Although the process 1400 is described with reference to the flowchart illustrated in FIG. 14, many other processes of autonomously delivering items may alternatively be used. For example, the order of execution of the steps in FIG. 14 may be changed. As another example, some of the steps may be changed, eliminated, or combined.

The delivery assembly 400 provides, in 1410, a user an access to a container in a vehicle through a door of the vehicle. A first item is present in the container and a second item is present in a receptacle. The receptacle is movably attached to the container. The delivery assembly 400 retrieves, in 1420, first sensor data generated by a sensor associated with the container. The delivery assembly 400 detects, in 1430, based on the first sensor data, removal of the first item from the container. In response to detecting the removal of the first item, the delivery assembly 400 provides, in 1440, an instruction, in a user interface associated with the container, to instruct the user to move the receptacle towards the door. Subsequent to providing the instruction, the delivery assembly 400 retrieves, in 1450, second sensor data generated by a sensor associated with the receptacle. The delivery assembly 400 detects, in 1460, based on the second sensor data, removal of the second item from the receptacle. Subsequent to detecting the removal of the second item, the delivery assembly 400 provides 1470 an instruction in the user interface to instruct the user to close the door of the vehicle.

Example Pickup Process

Figure 15:
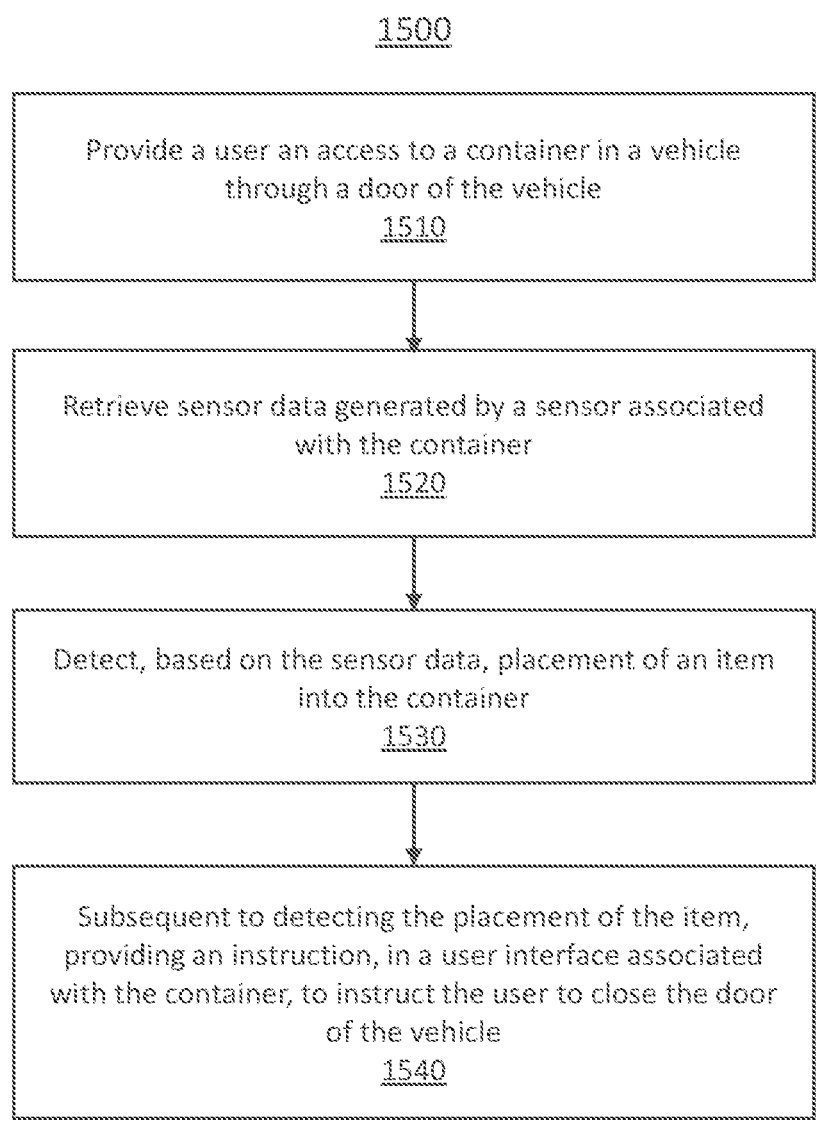
FIG. 15 is a flowchart showing a process of collecting an item from a user by using an AV 110 according to some embodiments of the present disclosure.

FIG. 15 is a flowchart showing a process 1500 of collecting an item from a user by using an AV 110 according to some embodiments of the present disclosure. The process 1500 may be performed by an onboard controller of an AV 110, e.g., the onboard controller 300. Although the process 1500 is described with reference to the flowchart illustrated in FIG. 15, many other processes of autonomously delivering items may alternatively be used. For example, the order of execution of the steps in FIG. 15 may be changed. As another example, some of the steps may be changed, eliminated, or combined.

The delivery assembly 400 provides, in 1510, a user an access to a container in a vehicle through a door of the vehicle. The delivery assembly 400 retrieves, in 1520, sensor data generated by a sensor associated with the container. The delivery assembly 400 detects, in 1530, based on the sensor data, placement of an item into the container. Subsequent to detecting the placement of the item, the delivery assembly 400 provides, in 1540, an instruction, in a user interface associated with the container, to instruct the user to close the door of the vehicle.

Figure 16:
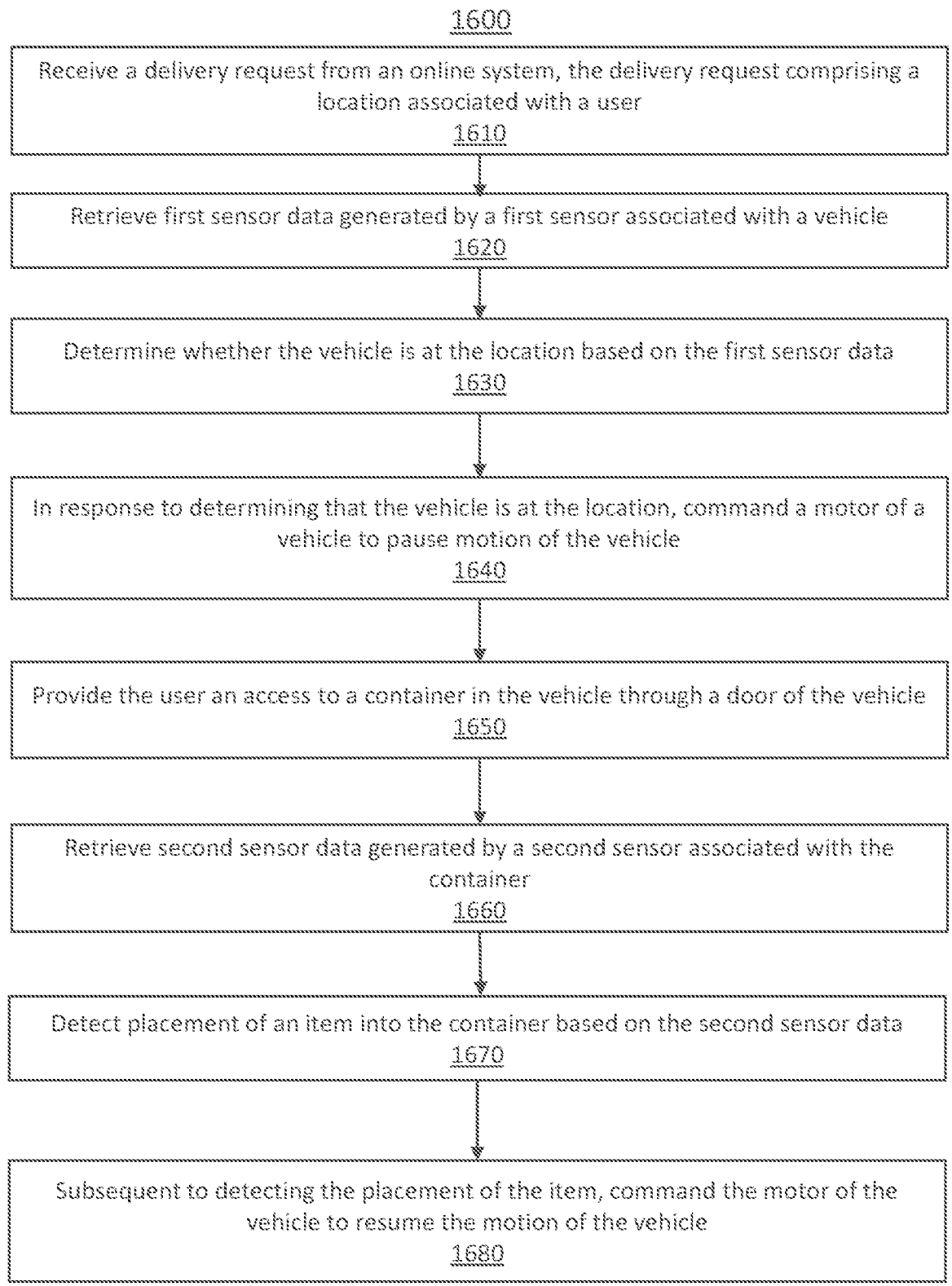
FIG. 16 is a flowchart showing another process of collecting an item from a user by using an AV 110 according to some embodiments of the present disclosure.

FIG. 16 is a flowchart showing another process 1600 of collecting an item from a user by using an AV 110 according to some embodiments of the present disclosure. The process 1600 may be performed by an onboard controller of an AV 110, e.g., the onboard controller 300. Although the process 1600 is described with reference to the flowchart illustrated in FIG. 16, many other processes of autonomously delivering items may alternatively be used. For example, the order of execution of the steps in FIG. 16 may be changed. As another example, some of the steps may be changed, eliminated, or combined.

The onboard controller 300 receives, in 1610, a delivery request from an online system. The delivery request includes a location associated with a user. The onboard controller 300 retrieves, in 1620, first sensor data generated by a first sensor associated with a vehicle. The onboard controller 300 determines, in 1630, whether the vehicle is at the location based on first sensor data generated by a first sensor associated with a vehicle. In response to determining that the vehicle is at the location, the onboard controller 300 commands, in 1640, a motor of the vehicle to pause motion of the vehicle. The onboard controller 300 provides, in 1650, the user an access to a container in the vehicle through a door of the vehicle. The onboard controller 300 retrieves, in 1660, second sensor data generated by a second sensor associated with the container. The onboard controller 300 detects, in 1670, removal of an item from the container based on the second sensor data. Subsequent to detecting the removal of the item, the onboard controller 300 commands, in 1680, the motor of the vehicle to resume the motion of the vehicle.

Figure 17:
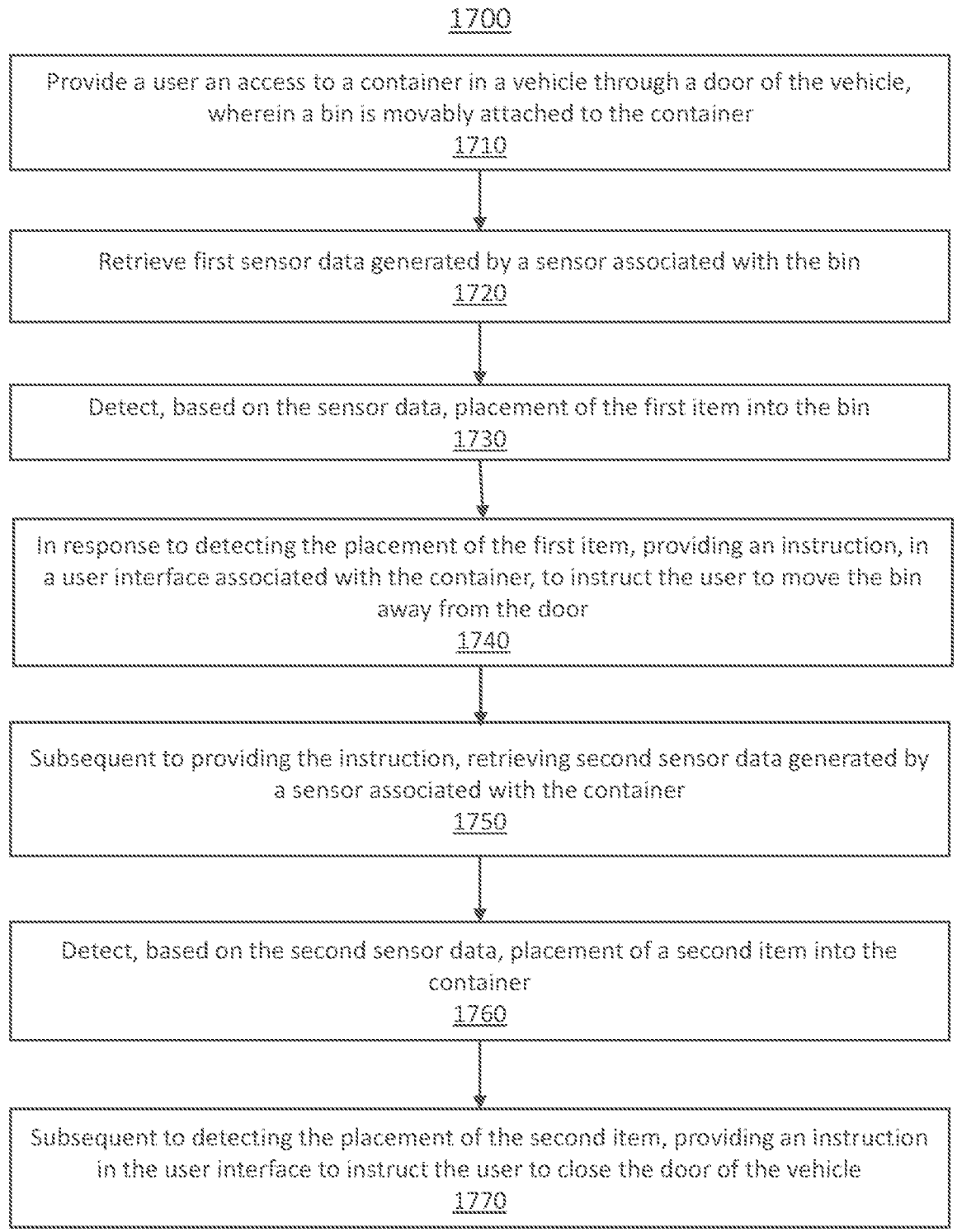
FIG. 17 is a flowchart showing yet another process of collecting an item from a user by using an AV 110 according to some embodiments of the present disclosure.

FIG. 17 is a flowchart showing yet another process 1700 of collecting an item from a user by using an AV 110 according to some embodiments of the present disclosure. The process 1700 may be performed by an onboard controller of an AV 110, e.g., the onboard controller 300. Although the process 1700 is described with reference to the flowchart illustrated in FIG. 17, many other processes of autonomously delivering items may alternatively be used. For example, the order of execution of the steps in FIG. 17 may be changed. As another example, some of the steps may be changed, eliminated, or combined.

The delivery assembly 400 provides, in 1710, a user an access to a receptacle in a vehicle through a door of the vehicle. The receptacle is movably attached to a container. The delivery assembly 400 retrieves, in 1720, first sensor data generated by a sensor associated with the receptacle, the delivery assembly 400 detects, in 1730, based on the first sensor data, placement of a first item into the receptacle. In response to detecting the placement of the first item, the delivery assembly 400 provides, in 1740, an instruction, in a user interface associated with the container, to instruct the user to move the receptacle away from the door. Subsequent to providing the instruction, the delivery assembly 400 retrieves, in 1750, second sensor data generated by a sensor associated with the container. The delivery assembly 400 detects, in 1760, based on the second sensor data, placement of a second item into the container. Subsequent to detecting the placement of the second item, the delivery assembly 400 provides, in 1770, an instruction in the user interface to instruct the user to close the door of the vehicle.

Select Examples

Example 1 provides a method for autonomous delivery. The method includes providing a user an access to a container in a vehicle through a door of the vehicle; retrieving sensor data generated by a sensor associated with the container; detecting, based on the sensor data, removal of an item from the container; and subsequent to detecting the removal of the item, providing an instruction, in a user interface associated with the container, to instruct the user to close the door of the vehicle.

Example 2 provides the method of example 1, where a receptacle that is movably attached to the container, further including in response to detecting the removal of the item, providing an indicator to the user through the user interface, the indicator informing the user to move the receptacle towards the door of the vehicle.

Example 3 provides the method of example 2, further including receiving, from the user through the user interface, a request to move the receptacle towards the door of the vehicle; and in response to receiving the request from the user, commanding an actuator to move the receptacle towards the door of the vehicle.

Example 4 provides the method of example 3, where providing the indicator to the user through the user interface includes illuminating a button in the user interface; and receiving, through the user interface, the request to move the receptacle relative to the door of the vehicle includes receiving an interaction of the user with the button.

Example 5 provides the method of example 1, where a divider is coupled to the container, divides the container into a first section and a second section with the item being in the first section and an additional item for an additional user being in the second section, and renders the additional item invisible from the door of the vehicle, further including subsequent to detecting the removal of the item, commanding an actuator to flip down the divider to make the additional item visible through the door of the vehicle.

Example 6 provides the method of example 1, further including subsequent to providing the user the access to the container in the vehicle through the door of the vehicle, providing an indicator to the user through a user interface, the indicator informing the user to remove the item from the container.

Example 7 provides the method of example 1, further including in response to detecting the removal of the item, providing an indicator to the user through a user interface, the indicator informing the user that a delivery of the item is completed.

Example 8 provides the method of example 1, where providing the user the access to the container in the vehicle through the door of the vehicle includes providing an indicator to the user through a user interface, the indicator informing the user to provide identification information; receiving, through a second sensor associated with the user interface, the identification information of the user; authenticating the identification information of the user; and subsequent to authenticating the identification information of the user, providing the user the access to the container in the vehicle through the door of the vehicle.

Example 9 provides the method of example 8, where the second sensor is a camera or a scanner.

Example 10 provides the method of example 1, where providing the instruction, in the user interface associated with the container, to instruct the user to close the door of the vehicle includes providing an indicator in the user interface, the indicator informing the user of the instruction and including light, text, sound, or some combination thereof.

Example 11 provides a method for autonomous delivery, the method including receiving a delivery request from an online system, the delivery request including a location associated with a user; retrieving first sensor data generated by a first sensor associated with a vehicle; determining whether the vehicle is at the location based on the first sensor data; in response to determining that the vehicle is at the location, commanding a motor of the vehicle to pause motion of the vehicle; providing the user an access to a container in the vehicle through a door of the vehicle; retrieving second sensor data generated by a second sensor associated with the container; detecting removal of an item from the container based on the second sensor data; and subsequent to detecting the removal of the item, commanding the motor of the vehicle to resume the motion of the vehicle.

Example 12 provides the method of example 11, where the container includes a user interface and a receptacle that is movably attached to the container, further including in response to detecting the removal of the item, providing an indicator to the user through the user interface, the indicator informing the user to move the receptacle towards the door of the vehicle.

Example 13 provides the method of example 12, further including receiving, from the user through the user interface, a request to move the receptacle towards the door of the vehicle; and in response to receiving the request from the user, commanding an actuator to move the receptacle towards the door of the vehicle.

Example 14 provides the method of example 13, where providing the indicator to the user through the user interface includes illuminating a button in the user interface; and receiving, through the user interface, the request to move the receptacle towards the door of the vehicle includes receiving an interaction of the user with the button.

Example 15 provides the method of example 11, where subsequent to detecting the removal of the item, commanding the motor of the vehicle to resume the motion of the vehicle includes providing an indicator to the user through a user interface, the indicator informing the user to close the door; retrieving third sensor data generated by a third sensor associated with the door; detecting whether the door has been closed based on the third sensor data; and in response to determining that the door has been closed, resuming the motion of the vehicle.

Example 16 provides the method of example 11, where providing the user the access to the container in the vehicle through the door of the vehicle includes providing an indicator to the user through a user interface, the indicator informing the user to provide identification information; receiving, through a third sensor associated with the user interface, the identification information of the user; authenticating the identification information of the user; and subsequent to authenticating the identification information of the user, providing the user the access to the container in the vehicle through the door of the vehicle.

Example 17 provides the method of example 11, where the delivery request further includes an item description, further including determining, based on the second sensor data, whether the item removed from the container matches the item description in the delivery request; and subsequent to determining that the item removed from the container matches the item description in the delivery request, commanding the motor of the vehicle to resume the motion of the vehicle.

Example 18 provides the method of example 11, further including generating one or more indicators for providing information associated with removing the item from the container to the user; and providing the one or more indicators to the user through a user interface associated with the container.

Example 19 provides the method of example 11, where a divider is coupled to the container, divides the container into a first section and a second section with the item being in the first section and an additional item for an additional user being in the second section, and renders the additional item invisible from the door of the vehicle, further including receiving an additional delivery request, the delivery request specifying delivery of the additional item to the additional user; and subsequent to detecting the removal of the item, commanding an actuator to flip down the divider to make the additional item visible through the door of the vehicle.

Example 20 provides a method for autonomous delivery, the method including providing a user an access to a container in a vehicle through a door of the vehicle, where a first item is present in the container and a second item is present in a receptacle that is movably attached to the container; retrieving first sensor data generated by a sensor associated with the container; detecting, based on the first sensor data, removal of the first item from the container; in response to detecting the removal of the first item, providing an instruction, in a user interface associated with the container, to instruct the user to move the receptacle towards the door; subsequent to providing the instruction, retrieving second sensor data generated by a sensor associated with the receptacle; detecting, based on the second sensor data, removal of the second item from the receptacle; and subsequent to detecting the removal of the second item, providing an instruction in the user interface to instruct the user to close the door of the vehicle.

Example 21 provides a method for autonomous delivery, the method including providing a user an access to a container in a vehicle through a door of the vehicle; retrieving sensor data generated by a sensor associated with the container; detecting, based on the sensor data, placement of an item into the container; and subsequent to detecting the placement of the item, providing an instruction, in a user interface associated with the container, to instruct the user to close the door of the vehicle.

Example 22 provides the method of example 21, where a receptacle that is movably attached to the container, and providing the user the access to the container in the vehicle through the door of the vehicle includes providing an indicator to the user through the user interface, the indicator informing the user an option of moving the receptacle towards the door of the vehicle; receiving, from the user through the user interface, a selection of the option; and in response to receiving the selection from the user, providing the user the access to the receptacle.

Example 23 provides the method of example 22, where providing the user the access to the receptacle includes commanding an actuator to move the receptacle towards the door of the vehicle.

Example 24 provides the method of example 22, where providing the indicator to the user through the user interface includes illuminating a button in the user interface; and receiving the selection of the option includes receiving an interaction of the user with the button.

Example 25 provides the method of example 21, further including subsequent to detecting the placement of the item, commanding an actuator to raise a divider in the container, where the divider divides the container into a first section and a second section, the item is in the first section, and the divider renders the item invisible through the door of the vehicle.

Example 26 provides the method of example 21, where providing the user the access to the container in the vehicle through the door of the vehicle includes providing an indicator to the user through the user interface, the indicator informing the user to provide identification information; receiving, through a second sensor associated with the user interface, the identification information of the user; authenticating the identification information of the user; and subsequent to authenticating the identification information of the user, providing the user the access to the container in the vehicle through the door of the vehicle.

Example 27 provides the method of example 26, where the second sensor is a camera or a scanner.

Example 28 provides the method of example 21, where providing the instruction, in the user interface associated with the container, to instruct the user to close the door of the vehicle includes providing an indicator in the user interface, the indicator informing the user of the instruction and including light, text, sound, or some combination thereof.

Example 29 provides the method of example 21, further including subsequent to providing the user the access to the container in the vehicle through the door of the vehicle, providing an indicator to the user through a user interface, the indicator informing the user to place the item into the container.

Example 30 provides the method of example 21, further including in response to detecting the placement of the item, providing an indicator to the user through a user interface, the indicator informing the user that a collection of the item is completed.

Example 31 provides a method for autonomous delivery, the method including receiving a delivery request from an online system, the delivery request including a location associated with a user; retrieving first sensor data generated by a first sensor associated with a vehicle; determining whether the vehicle is at the location based on the first sensor data; in response to determining that the vehicle is at the location, commanding a motor of the vehicle to pause motion of the vehicle; providing the user an access to a container in the vehicle through a door of the vehicle; retrieving second sensor data generated by a second sensor associated with the container; detecting placement of an item in the container based on sensor data generated by a sensor associated with the container; and subsequent to detecting the placement of the item, commanding the motor of the vehicle to resume the motion of the vehicle.

Example 32 provides the method of example 31, where the container includes a user interface and a receptacle that is movably attached to the container, where providing the user the access to the container in the vehicle through the door of the vehicle includes providing an indicator to the user through the user interface, the indicator informing the user an option of moving the receptacle towards the door of the vehicle; receiving, from the user through the user interface, a selection of the option; and in response to receiving the selection from the user, providing the user the access to the receptacle.

Example 33 provides the method of example 32, where providing the user the access to the receptacle includes commanding an actuator to move the receptacle to the position selected by the user.

Example 34 provides the method of example 32, where providing the indicator to the user through the user interface includes illuminating a button in the user interface; and receiving the selection of the position of the receptacle in the container includes receiving an interaction of the user with the button.

Example 35 provides the method of example 31, where providing the user the access to the container in the vehicle through the door of the vehicle includes providing an indicator to the user through a user interface, the indicator informing the user to provide identification information; receiving, through a third sensor associated with the user interface, the identification information of the user; authenticating the identification information of the user; and subsequent to authenticating the identification information of the user, providing the user the access to the container in the vehicle through the door of the vehicle.

Example 36 provides the method of example 31, where the delivery request further includes an item description, further including determining, based on the second sensor data, whether the item placed in the container matches the item description in the delivery request;

and subsequent to determining that the item placed in the container matches the item description in the delivery request, commanding the motor of the vehicle to resume the motion of the vehicle.

Example 37 provides the method of example 31, further including generating one or more indicators for providing information associated with placing the item in the container to the user; and providing the one or more indicators to the user through a user interface associated with the container.

Example 38 provides the method of example 37, where the one or more indicators include light, text message, sound, or some combination thereof.

Example 39 provides the method of example 31, further including receiving an additional delivery request, the additional delivery request specifying collection of an additional item from an additional user associated with an addition location; detecting placement of the additional item in the container based on third sensor data generated by the second sensor associated with the container; and subsequent to detecting the placement of the additional item in the container, commanding an actuator to raise a divider in the container, the divider dividing the container into a first section and a second section with the additional item being in the first section, the divider rendering the additional item invisible through the door of the vehicle, where providing the user the access to a container in the vehicle through the door of the vehicle includes providing the user an access to the second section of the container.

Example 40 provides a method for autonomous delivery, the method including providing a user an access to a receptacle in a vehicle through a door of the vehicle, wherein the receptacle is movably attached to a container; retrieving first sensor data generated by a sensor associated with the receptacle; detecting, based on the first sensor data, placement of a first item into the receptacle; in response to detecting the placement of the first item, providing an instruction, in a user interface associated with the container, to instruct the user to move the receptacle away from the door; subsequent to providing the instruction, retrieving second sensor data generated by a sensor associated with the container; detecting, based on the second sensor data, placement of a second item into the container; and subsequent to detecting the placement of the second item, providing an instruction in the user interface to instruct the user to close the door of the vehicle.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for autonomous delivery, the method comprising:
   providing a user an access to a container in a vehicle through a door of the vehicle;
   retrieving sensor data generated by a sensor associated with the container;
   detecting, based on the sensor data, placement of an item into the container; and
   subsequent to detecting the placement of the item, providing an instruction, in a user interface associated with the container, to instruct the user to close the door of the vehicle; and
   subsequent to detecting the placement of the item, commanding an actuator to raise a divider in the container, wherein the divider divides the container into a first section and a second section, the item is in the first section, and the divider renders the item invisible through the door of the vehicle.

2. The method of claim 1, wherein a receptacle is movably attached to the container, and providing the user the access to the container in the vehicle through the door of the vehicle comprises:
   providing an indicator to the user through the user interface, the indicator informing the user an option of moving the receptacle towards the door of the vehicle;
   receiving, from the user through the user interface, a selection of the option; and
   in response to receiving the selection from the user, providing the user the access to the receptacle.

3. The method of claim 2, wherein providing the user the access to the receptacle comprises:
   commanding an actuator to move the receptacle towards the door of the vehicle.

4. The method of claim 2, wherein providing the indicator to the user through the user interface comprises illuminating a button in the user interface; and receiving the selection of the option comprises receiving an interaction of the user with the button.

5. The method of claim 1, wherein providing the user the access to the container in the vehicle through the door of the vehicle comprises:
providing an indicator to the user through the user interface, the indicator informing the user to provide identification information;
receiving, through a second sensor associated with the user interface, the identification information of the user;
authenticating the identification information of the user; and
subsequent to authenticating the identification information of the user, providing the user the access to the container in the vehicle through the door of the vehicle.

6. The method of claim 5, wherein the second sensor is a camera or a scanner.

7. The method of claim 1, wherein providing the instruction, in the user interface associated with the container, to instruct the user to close the door of the vehicle comprises:
providing an indicator in the user interface, the indicator informing the user of the instruction and including light, text, sound, or some combination thereof.

8. The method of claim 1, further comprising:
subsequent to providing the user the access to the container in the vehicle through the door of the vehicle, providing an indicator to the user through a user interface, the indicator informing the user to place the item into the container.

9. The method of claim 1, further comprising:
in response to detecting the placement of the item, providing an indicator to the user through a user interface, the indicator informing the user that a collection of the item is completed.

10. A method for autonomous delivery, the method comprising:
receiving a delivery request from an online system, the delivery request comprising a location associated with a user;
retrieving first sensor data generated by a first sensor associated with a vehicle;
determining whether the vehicle is at the location based on the first sensor data;
in response to determining that the vehicle is at the location, commanding a motor of the vehicle to pause motion of the vehicle;
providing the user an access to a container in the vehicle through a door of the vehicle;
retrieving second sensor data generated by a second sensor associated with the container;
detecting placement of an item in the container based on sensor data generated by a sensor associated with the container; and
subsequent to detecting the placement of the item, commanding the motor of the vehicle to resume the motion of the vehicle; and
receiving an additional delivery request, the additional delivery request specifying collection of an additional item from an additional user associated with an addition location;
detecting placement of the additional item in the container based on third sensor data generated by the second sensor associated with the container; and
subsequent to detecting the placement of the additional item in the container, commanding an actuator to raise a divider in the container, the divider dividing the container into a first section and a second section with the additional item being in the first section, the divider rendering the additional item invisible through the door of the vehicle,
wherein providing the user the access to a container in the vehicle through the door of the vehicle comprises providing the user an access to the second section of the container.

11. The method of claim 10, wherein the container includes a user interface and a receptacle that is movably attached to the container, wherein providing the user the access to the container in the vehicle through the door of the vehicle comprises:
providing an indicator to the user through the user interface, the indicator informing the user an option of moving the receptacle towards the door of the vehicle;
receiving, from the user through the user interface, a selection of the option; and
in response to receiving the selection from the user, providing the user the access to the receptacle.

12. The method of claim 11, wherein providing the user the access to the receptacle comprises:
commanding an actuator to move the receptacle to the position selected by the user.

13. The method of claim 11, wherein providing the indicator to the user through the user interface comprises illuminating a button in the user interface; and receiving the selection of the position of the receptacle in the container comprises receiving an interaction of the user with the button.

14. The method of claim 10, wherein providing the user the access to the container in the vehicle through the door of the vehicle comprises:
providing an indicator to the user through a user interface, the indicator informing the user to provide identification information;
receiving, through a third sensor associated with the user interface, the identification information of the user;
authenticating the identification information of the user; and
subsequent to authenticating the identification information of the user, providing the user the access to the container in the vehicle through the door of the vehicle.

15. The method of claim 10, wherein the delivery request further comprises an item description, further comprising:
determining, based on the second sensor data, whether the item placed in the container matches the item description in the delivery request; and
subsequent to determining that the item placed in the container matches the item description in the delivery request, commanding the motor of the vehicle to resume the motion of the vehicle.

16. The method of claim 10, further comprising:
generating one or more indicators for providing information associated with placing the item in the container to the user; and
providing the one or more indicators to the user through a user interface associated with the container.

17. The method of claim 16, wherein the one or more indicators include light, text message, sound, or some combination thereof.

18. A method for autonomous delivery, the method comprising:
providing a user an access to a receptacle in a vehicle through a door of the vehicle, wherein the receptacle is movably attached to a container;

retrieving first sensor data generated by a sensor associated with the receptacle;

detecting, based on the first sensor data, placement of a first item into the receptacle;

in response to detecting the placement of the first item, providing an instruction, in a user interface associated with the container, to instruct the user to move the receptacle away from the door;

subsequent to providing the instruction, retrieving second sensor data generated by a sensor associated with the container;

detecting, based on the second sensor data, placement of a second item into the container; and subsequent to detecting the placement of the second item, providing an instruction in the user interface to instruct the user to close the door of the vehicle; and subsequent to detecting the placement of the second item, commanding an actuator to raise a divider in the container, wherein the divider divides the container into a first section and a second section, the second item is in the first section, and the divider renders the second item invisible through the door of the vehicle.

* * * * *